United States Patent [19]
Yamamori et al.

[11] Patent Number: 5,355,357
[45] Date of Patent: Oct. 11, 1994

[54] DISC PLAYER AND DISC LOADING DEVICE

[75] Inventors: Eiji Yamamori, Tokyo; Koji Takagi, Kanagawa, both of Japan

[73] Assignee: Sony Corporation, Tokyo, Japan

[21] Appl. No.: 861,177

[22] Filed: Mar. 27, 1992

Related U.S. Application Data

[63] Continuation of Ser. No. 639,247, Jan. 8, 1991.

[30] Foreign Application Priority Data

Jan. 20, 1990 [JP] Japan .................. 2-11619

[51] Int. Cl.$^5$ .......................................... G11B 17/035
[52] U.S. Cl. .................. 369/75.2; 369/77.2; 361/680; 361/681; 364/708.1; 400/682
[58] Field of Search ............... 369/75.1, 75.2, 77.1, 369/77.2, 292, 78, 12, 13; 361/380, 390, 391, 392; 364/708; 400/682, 693; D14/106, 109, 115, 116

[56] References Cited

U.S. PATENT DOCUMENTS

| | | | |
|---|---|---|---|
| 3,524,970 | 8/1970 | Wang | 235/61.6 |
| 3,612,676 | 10/1971 | Ooba et al. | 353/27 |
| 3,751,825 | 8/1973 | Barrett | 35/6 |
| 3,925,779 | 12/1975 | Gerstenhaber | 340/337 |
| 3,932,859 | 1/1976 | Kyriakides | 340/711 |
| 3,938,139 | 2/1976 | Day | 340/324 |
| 4,016,411 | 4/1977 | Genin | 235/156 |
| 4,086,655 | 4/1978 | Tanimoto et al. | 364/705 |
| 4,096,577 | 6/1978 | Ferber et al. | 364/712 |
| 4,104,727 | 8/1978 | Washizuka et al. | 364/710 |
| 4,120,039 | 10/1978 | Fischer | 364/705 |
| 4,160,242 | 7/1979 | Fowler et al. | 340/711 |
| 4,180,337 | 12/1979 | Otey, III et al. | 400/486 |
| 4,255,801 | 3/1981 | Ode et al. | 368/1 |
| 4,398,086 | 8/1983 | Smith, III | 235/145 |
| 4,439,850 | 3/1984 | Takahara | 369/270 |
| 4,667,299 | 5/1987 | Dunn | 364/708 |
| 4,744,072 | 5/1988 | Tamaki | 369/270 |
| 4,755,895 | 7/1988 | Saito | 369/270 |
| 4,811,314 | 3/1989 | Alves | 369/12 |
| 4,815,065 | 3/1989 | Rouws | 369/77.2 |
| 4,823,337 | 4/1989 | Van Zanten | 369/270 |
| 4,837,590 | 6/1989 | Sprague | 346/145 |
| 4,872,151 | 10/1989 | Smith | 369/33 |
| 4,893,295 | 1/1990 | Matsuura et al. | 369/75.2 |
| 4,964,005 | 10/1990 | Uzuki | 369/77.2 |
| 5,021,922 | 6/1991 | Davis et al. | 361/380 |
| 5,036,313 | 7/1991 | Lin et al. | 361/380 X |
| 5,163,038 | 11/1992 | Arai | 369/77.2 |

FOREIGN PATENT DOCUMENTS

| | | |
|---|---|---|
| 0194138A3 | 9/1986 | European Pat. Off. |
| 0252646A1 | 1/1988 | European Pat. Off. |
| 0292942A1 | 11/1988 | European Pat. Off. |
| 0436877A2 | 7/1991 | European Pat. Off. |
| 51-11541 | 1/1975 | Japan . |
| 50-10050 | 2/1975 | Japan . |
| 0112401 | 6/1984 | Japan ............... 369/75.1 |
| 60-160418 | 8/1985 | Japan ............... 364/408 |
| 0107449 | 6/1988 | Japan ............... 369/75.1 |
| 01040449 | 6/1988 | Japan ............... 369/270 |
| 0326027 | 3/1930 | United Kingdom ...... 369/75.1 |

OTHER PUBLICATIONS

IBM Technical Disclosure Bulletin vol. 29, No. 8 Jan. 1987.
Patent Abstracts of Japan, vol. 8, No. 114 (P-284)(1581), Jul. 5, 1984 & JP-A-59 042 667 (Hitachi), Mar. 9, 1984.
Patent Abstracts of Japan, vol. 9, No. 33 (P-334)(1756), Feb. 13, 1985 & JP-A-59 175 068 (Toshiba), Oct. 3, 1984.
Patent Abstracts of Japan, vol. 5, No. 137 (E-72), Aug. 29, 1981 & JP-A-56 073 985 (Pioneer), Aug. 29, 1981.

*Primary Examiner*—Stuart S. Levy
*Assistant Examiner*—Paul J. Ditmyer
*Attorney, Agent, or Firm*—Limbach & Limbach

[57] ABSTRACT

A disc player for reading out and reproducing information signals recorded on an information disc, such as an optical disc, and displaying the read out and reproduced information signals on a display section, and a loading device for loading an information disc, such as an optical disc, or a disc table, in which both a disc proper and a disc cartridge comprised of a disc and a cartridge accommodating such disc may be loaded on the disc table. The disc player enables the information on the disc to be read out and reproduced and the readout and reproducing information to be displayed as a visual information, and is reduced in size so as to be portable. The loading device enables both the disc cartridge and the disc proper to be loaded on the disc player.

57 Claims, 25 Drawing Sheets

DISC PLAYER AND DISC LOADING DEVICE

This is a continuation of co-pending application Ser. No. 07/639,247 filed on Jan. 8, 1991, now abandoned.

BACKGROUND OF THE INVENTION

1. Field of the Invention

This invention relates to a disc player for reading out and reproducing information signals recorded on an information disc, such as an optical disc, and for displaying the read out and reproduced information signals on a display section, and a loading device whereby the information disc, such as an optical disc, on a disc table, in which both a disc proper and a disc cartridge comprised of a disc and a cartridge accommodating the disc therein may be loaded on the disc table.

2. Description of the Prior Art

An optical disc has so far been used as a recording medium for recording musical sound information signals, image information signals or the like information signals.

The optical disc is comprised of a base plate of a synthetic resin, such as a transparent polycarbonate resin, a recording layer formed on the base plate, and a layer of a transparent synthetic resin formed on the recording layer. Such optical disc exhibits sufficient mechanical strength as compared with the magnetic disc or the like formed by a film sheet as the base material. The recording layer covered by the synthetic resin exhibits sufficient durability against dust and dirt. Thus the so-called compact disc, which is an optical disc on which musical sound signals or the like are recorded, is handled as a disc per se, and loaded by itself on a disc player.

On the optical disc, information signals are recorded at a higher recording density. The information signals may be rewritten on certain types of optical discs, or with magneto-optical discs operating under the photomagnetic effects. With this type of disc, deposition of only a small amount of dust and dirt on the signal recording surface results in dropout in recording or reproduction of the information signals so as to render it impossible to maintain satisfactory recording and/or reproducing characteristics.

For this reason, this type of optical disc is accommodated in a main cartridge body and loaded in this state on the disc player.

Meanwhile, the disc player or the like apparatus in which the optical disc per se is used as the recording medium is designed so that only the disc per se may be loaded, whereas the disc player in which the disc cartridge comprised of a main cartridge body and an optical disc accommodated therein is used as the recording medium is designed so that only the disc cartridge may be loaded, while the disc proper cannot be loaded.

In a disc player in which the optical disc is used as the recording medium, it is desirable to enable information signals recorded on at least a plurality of optical discs types to be read out and reproduced through standardization of the recording formats for these different optical discs.

On the other hand, it is also tried to develop a disc player for which both the optical disc proper or the disc cartridge may be used as the recording medium.

The above described disc player of the type in which information signals such as Japanese language dictionary data or the English-Japanese dictionary data are recorded on the optical disc, and desired data are read out from the disc so as to be displayed on the display section, is currently in use.

Such disc player is constituted by a disc drive unit adapted for rotating an information disc such as an optical disc on which the predetermined information is recorded, and reading out and reproducing the information recorded on the disc, a keyboard device for selecting the desired information to be read and reproduced from the information recorded on the disc, and a display device for displaying the information read out from the disc as, for example, the letter or character information.

Meanwhile, the conventional disc reproducing apparatus is constituted by a disc drive device, a keyboard device and a display device, these being separate devices put together and used as a desk type unit. The devices making up the disc reproducing apparatus tend to be bulky in size and hence cannot be adapted as portable devices.

On the other hand, by reason of the drastically improved recording density in the information disc, such as the optical disc, the information corresponding to a voluminous Japanese language dictionary or English-Japanese dictionary may now be recorded on an optical disc which is 8 cm in diameter.

Thus there is a demand for an apparatus whereby the small-sized optical disc on which the information signals have been recorded at a high recording density may be transported and the desired information may be read out and reproduced easily at a desired place so as to be displayed as the visual information on the display device.

OBJECT AND SUMMARY OF THE INVENTION

It is an object of the present invention to provide an electronic apparatus in which the disc drive device, keyboard device and the display device, which were conventionally designed as separate devices, are put together as a unified system to reduce the size of the apparatus in its entirety so as to be portable.

It is another object of the present invention to provide an electronic apparatus in which the function of reading out and reproducing the desired information from the information disc such as the optical disc and the function of displaying the reproduced desired information as the visual information have been unified.

It is a further object of the present invention to provide a disc player in which the optical disc proper or the disc cartridge may each be used as the recording medium.

It is yet another object of the present invention to provide a disc loading device enabling the optical disc proper or the disc cartridge to be each loaded on the disc recording and/or reproducing apparatus.

The disc player according to the present invention comprises a main body including a disc rotating driving device and information signal readout means for reading out information signals recorded on a disc rotationally driven by the disc rotating driving device, a first cover rotatably supported by the main body and having at least the operating buttons on at least one surface thereof and a disc clamper on the surface thereof opposite to said one surface, said first cover being closed to cover at least a portion of a disc loading section where a disc placed on a disc table of the disc rotating driving device is positioned, said disc clamper clamping the disc placed on said disc table in cooperation with said disc table, and a second cover rotatably supported by said main body and having a display section on at least one surface thereof, said second cover laying on said first cover to cover at least a portion of said main body.

With the above described disc player, the first cover and the second cover rotatably supported by the main body provided with the disc rotating and driving device and readout means for reading out information signals recorded on a disc rotated by the disc rotating driving device, are brought sequentially to the closure position, whereby the second cover is superimposed on the first cover and the first and second covers thus superimposed one on the other are closed upon the main body of the disc player.

The disc placed on the disc table of the disc rotating driving device, which is provided on the main body of the disc player, is clamped, when the first cover is closed on the main body, by a disc clamper provided in the first cover and the disc table, so that the disc may be rotated in unison with the disc table. With the first cover thus closed, the disc is driven rotationally to read out and reproduce the information signals by the information signal readout means. With the first cover thus closed, the operating buttons provided on the first cover are open to the outside and the desired information may be read out and reproduced from the disc subject to actuation of these operating buttons. The information thus read out and reproduced is displayed on a display section provided on the second cover.

The disc loading device of the present invention is comprised of a cartridge holder supported for movement between a raised position and a lowered position relative to the main body of the recording/reproducing apparatus provided with a disc table adapted for rotating a disc placed thereon, said cartridge holder being adapted to hold a disc cartridge inserted therein, said disc cartridge accommodating the disc rotatably therein, a disc clamper for clamping the disc placed on said disc table in cooperation with said disc table when said cartridge holder has been moved to the lowered position, a shutter opening mechanism for at least opening a shutter adapted for opening an aperture provided in said disc cartridge in association with the insertion and removal of the disc cartridge into and out of said cartridge holder, and shutter opening member shifting means for shifting the shutter opening member to a position not obstructing the rotation of the disc placed on the disc table in association with the shifting of the cartridge holder to its lowered position.

With the above described disc loading apparatus, when the disc cartridge is inserted into the cartridge holder, the shutter of the disc cartridge is opened by a shutter opening and closing unit provided on the cartridge holder. When the cartridge holder thus inserted into and held by the cartridge holder is lowered, the disc table is introduced into the main cartridge body through a disc table inserting aperture which has been opened by the opening of the shutter, and the disc is placed on the disc table, at the same time that the disc clamper is introduced into the main cartridge body by way of the disc table inserting aperture to clamp the disc by the disc table and the disc clamper to permit the rotation of the disc in unison with the disc table.

When the cartridge holder is lowered without inserting the disc cartridge, the shutter opening member is receded by the shutter opening member shifting means, in association with the descent of the cartridge holder, to a position not obstructing the rotation of the disc placed on the disc table. That is, since the shutter opening member has been shifted to a position not obstructing disc rotation even when the cartridge holder is lowered towards the disc table without inserting the disc cartridge into the cartridge holder, the disc proper may be placed in advance on the disc table.

The above and other objects, features and advantages of the present invention will become more apparent from the following description especially when read in conjunction with the accompanying drawings.

DETAILED DESCRIPTION OF PREFERRED EMBODIMENT

The present invention will be hereinafter explained with reference to a disc player in which a disc cartridge comprised of a main cartridge body accommodating therein an optical disc with the information or data corresponding to a Japanese language dictionary or an English-Japanese dictionary recorded thereon or an optical disc proper with musical sound signals or the like recorded thereon may be selectively used as a recording medium, and in which the information or data read out and reproduced from the disc in the main cartridge body may be displayed on the display section, by way of realizing the function of reproducing the optical disc and the function of displaying the reproduced information simultaneously.

Figure 1:
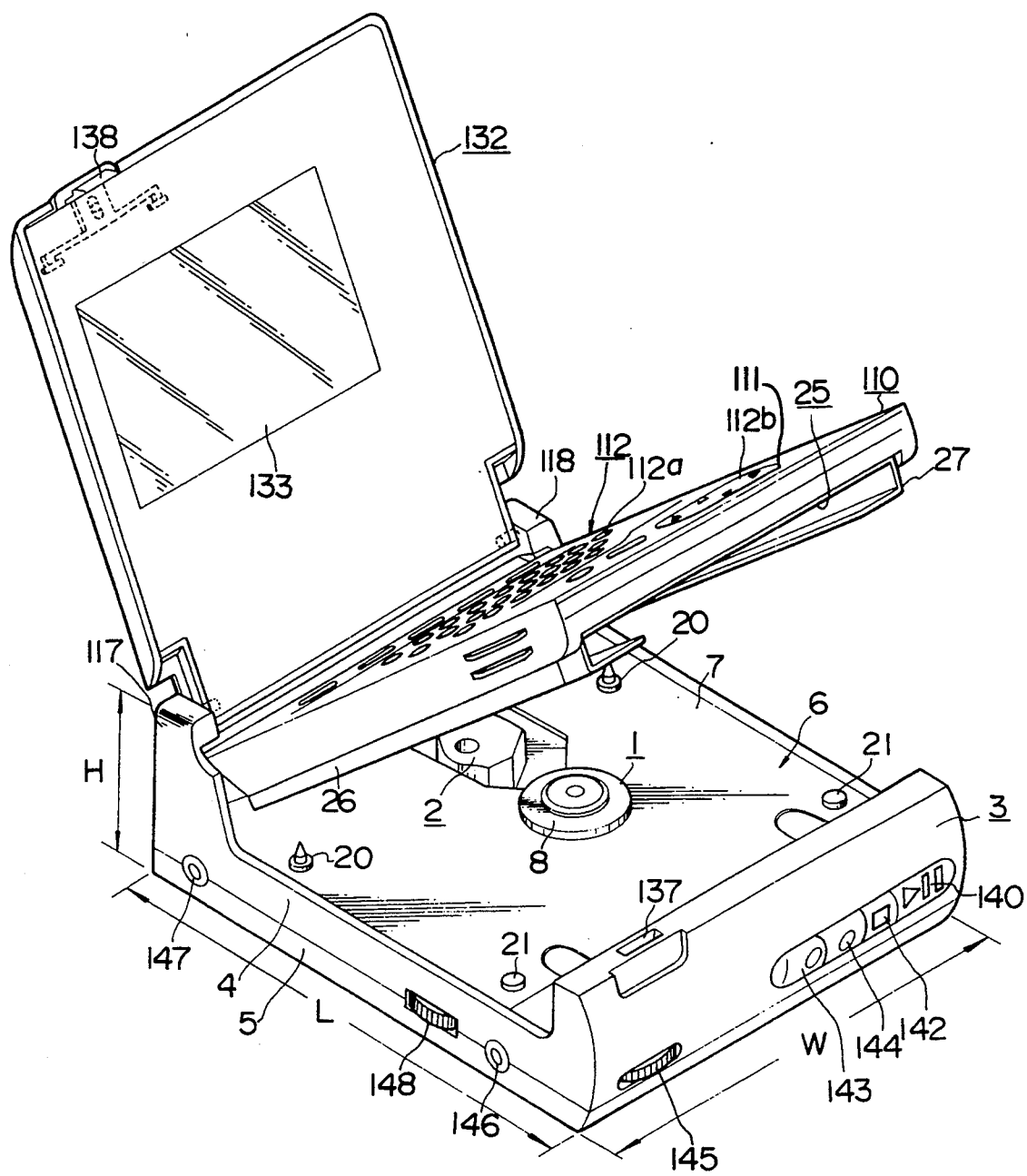
FIG. 1 is a perspective view of a disc player according to the present invention, with the first and second covers being opened.
Figure 2:
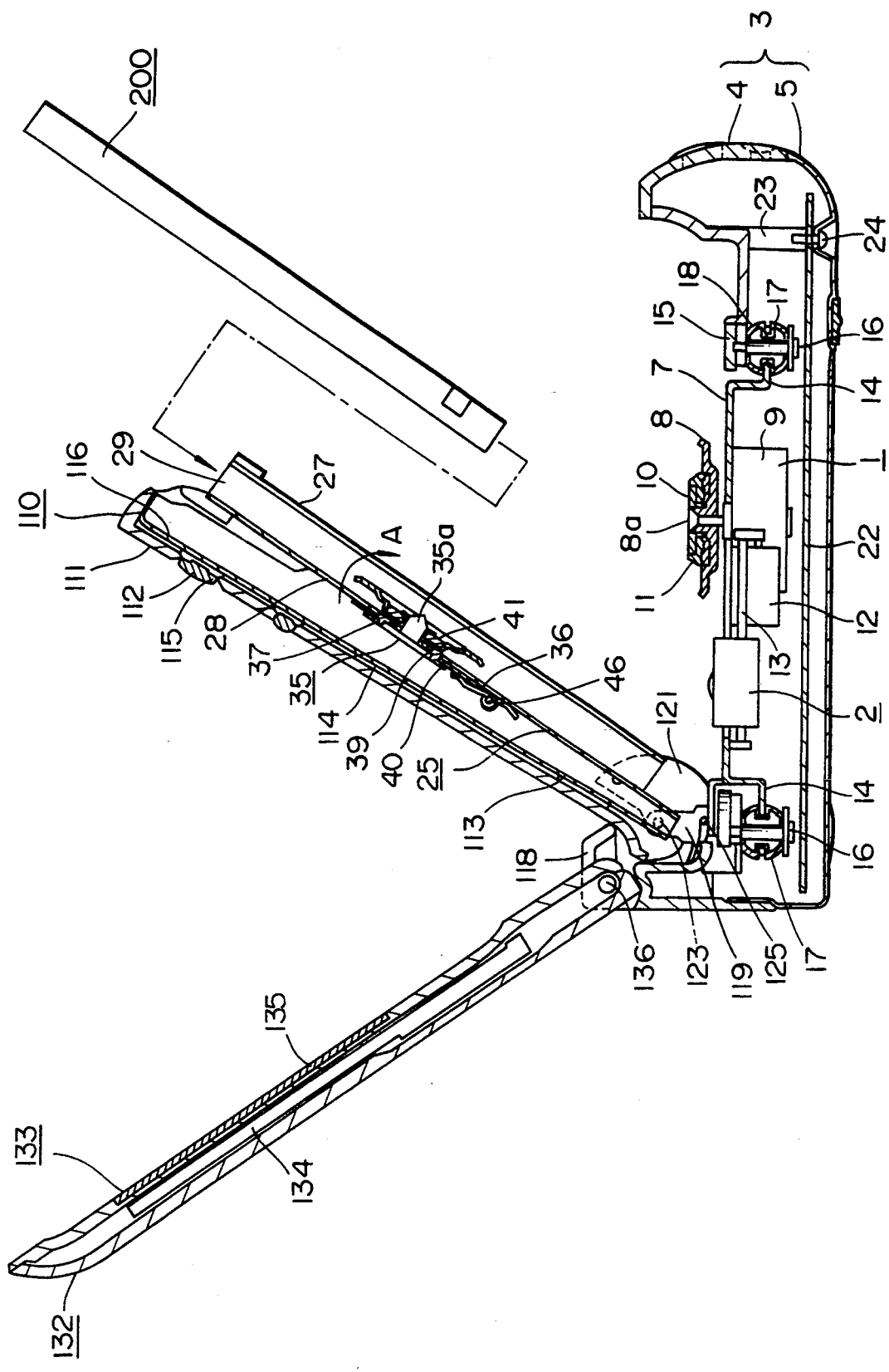
FIG. 2 is a cross-sectional view showing the inner structure of the disc player.

Referring to FIGS. 1 and 2, the disc player according to the present invention includes a main body 3 having accommodated therein a disc rotating-driving unit 1 for rotationally driving an optical disc contained in a main cartridge body of a disc cartridge, or an optical disc proper, and an optical pickup unit 2 functioning as information signal readout means for reading and reproducing information signals recorded on the optical disc rotationally driven by the unit 1.

The main body 3 is constituted by a rectangular box-shaped cabinet 4 and a bottom plate 5 closing a bottom opening of the cabinet 4, as shown in FIG. 2. The main body 3 includes a disc loading section 6 on its upper surface which is sized to receive the disc cartridge accommodating therein an optical disc which is 8 cm in diameter, as shown in FIG. 1. The main body 3 is of a size that can be placed on the palm of a hand and is about 105 mm in width (W), about 135 mm is length (L) and about 45 mm in height (H).

The disc rotating-driving device 1 and the optical pickup 2 are mounted on a chassis base plate 7, obtained by punching a metal plate, and are mounted within the cabinet 4 by means of this chassis base plate 7.

The disc rotating-driving device 1 includes a disc table 8 on which the optical disc is placed and which is rotationally driven along with the optical disc, and a spindle motor 9 rotationally driving the disc table 8. As shown in FIG. 2, this spindle motor 9 has a spindle 10 projecting above the upper surface of the chassis base plate 7 and is mounted on the lower surface of the chassis base plate 7. The disc table 8, on which rests the optical disc, is mounted on the distal end of the spindle 10 for rotation in unison with the spindle 10. A centering member 11 is provided at the center of the disc table 8 for fitting into a central opening of the optical disc for aligning the center of rotation of the disc table 8 with the center of the optical disc. This centering member 11 is mounted under the bias of a coil spring or the like so as to be movable along the axis of the spindle 10, so that, when the optical disc is placed on the disc table 8, the centering member 11 is fitted into the central opening of the disc, while being resiliently biased and deviated along the axis of the spindle, for bringing the central opening of the disc into alignment with the center of rotation of the disc table 8.

The optical pickup unit 2 is supported by a feed screw 13 rotationally driven by a pickup feed motor 12 mounted on the lower surface of the chassis base plate 7 and a slide guide block mounted on the lower surface of the chassis base plate 7, so that the pickup unit 2 may be moved linearly along the radius of the disc placed on the disc table 8. The optical pickup unit 2 may be fed along the radius of the optical disc by the feed screw 13 being rotationally driven by the pickup feed motor 12.

Figure 22:
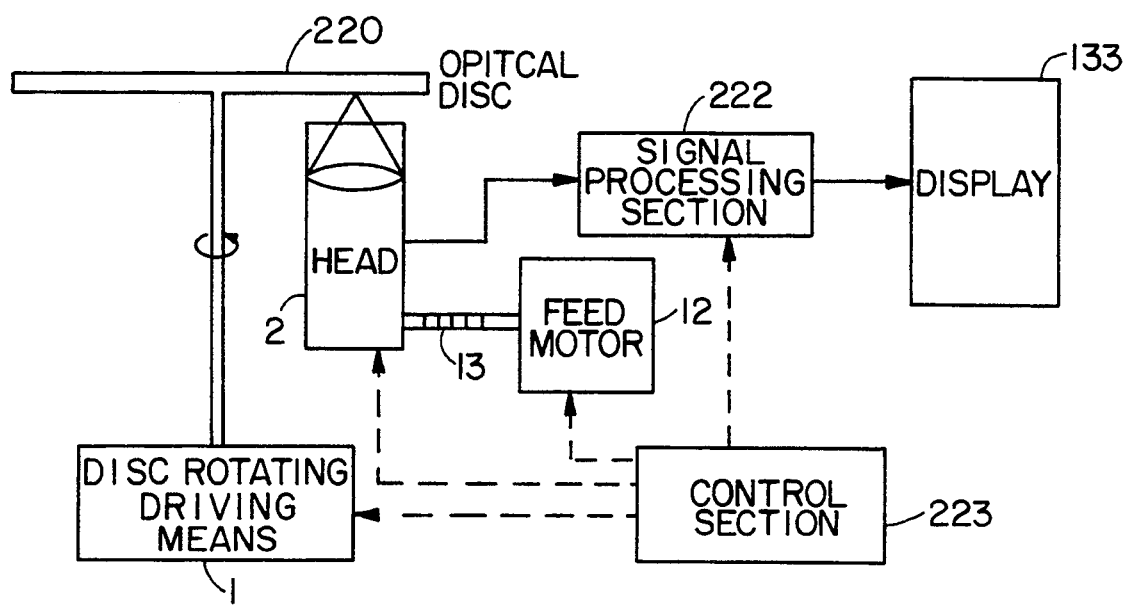
FIG. 22 is a simplified block diagram of some of the principal components of the disc player.

Refering briefly to the simplified block diagram of FIG. 22, the subject disc player includes a disk rotating driving means 1 for rotating the disk 220 to be played. The player also includes a head 2 for reading out information signals recorded on the disk. Head 2 is driven along the radius of the disk by feed motor 12 driving feed screw 13. A signal processing unit 222 is included for processing the signals read out by the head. Display section 133 displays information recorded on the disk. A control section 223 represents the components for controlling the operation of the disk rotating driving means 1, the head 2, the feed motor 12 and the signal processing section 222.

Refering back to FIGS. 1 and 2, the chassis base plate 7, on which the disc rotating driving device 1 and the optical pickup device 2 have been mounted, is mounted within the cabinet 4, by way of an L-shaped mounting piece 14 in the vicinity of each corner of the chassis base plate 7 secured to a supporting piece 15 in the vicinity of each corner of the cabinet 4 by a set screw 16. A buffer member 17 is interposed between the mounting piece 14 and the supporting piece 15 to prevent an impact or the like disturbances applied to the cabinet 4 from being transmitted from the cabinet to the chassis base plate 7 and interfering with the feed motion of the optical pickup device 2 or the disc rotation by the disc rotating-driving device 1. Thus buffer member 17 is formed by rubber or the like elastic member and a coil spring 18 disposed therein to augment the buffer action of the buffer member. The buffer member 17 is supported with an engaging groove 17a on the central perimetral portion thereof fitted into a recess 14a in the mounting piece 14, such that, when the chassis base plate 7 is mounted on the cabinet 4, the buffer member is interposed between the mounting piece 14 and the supporting piece 15.

The upper surface of the cabinet 4, on which rests the disc table 8 of the disc rotating-driving device 1 mounted on the chassis base plate 7 and which is mounted in turn on the cabinet 4, functions as a disc loading section 6 on which to load the disc cartridge accommodating an optical disc placed on the disc table 8.

On the upper surface of the chassis base plate 7, there are provided positioning pins 20 and height setting pins 21 for setting the horizontal position and height level of the disc cartridge loaded on the disc loading section 6.

Within the cabinet 4, there are provided a signal processing circuit for processing information signals read out from the optical disc by the optical pickup device 2, and an electrical circuit base plate 22 constituting an electrical circuit necessary for constituting a reproducing apparatus for a disc, such as a control circuit controlling the transfer of the optical pickup device 2. As shown in FIG. 2, this electrical circuit base plate 22 is mounted by a set screw 24 to a depending boss 23 in the cabinet 4 along the bottom plate 5 of the cabinet 4.

A cartridge holder 25 is mounted by the chassis base plate 7, on which the disc rotating-driving device 1 and the optical pickup device 2 have been mounted as described previously. This disc cartridge 25 is adapted for loading a disc cartridge 200 constructed as shown in FIGS. 15 to 16 on the disc loading section 6 within the main body 3 and placing an optical disc 201 accommodated in the disc cartridge 200 on the disc table 8, and is mounted on the chassis base plate 7 so as to be turned between a lowered position covering the disc loading section 6 and an open or raised position opening the loading section 6 to enable the insertion or removal of the disc cartridge 200.

Figure 15:
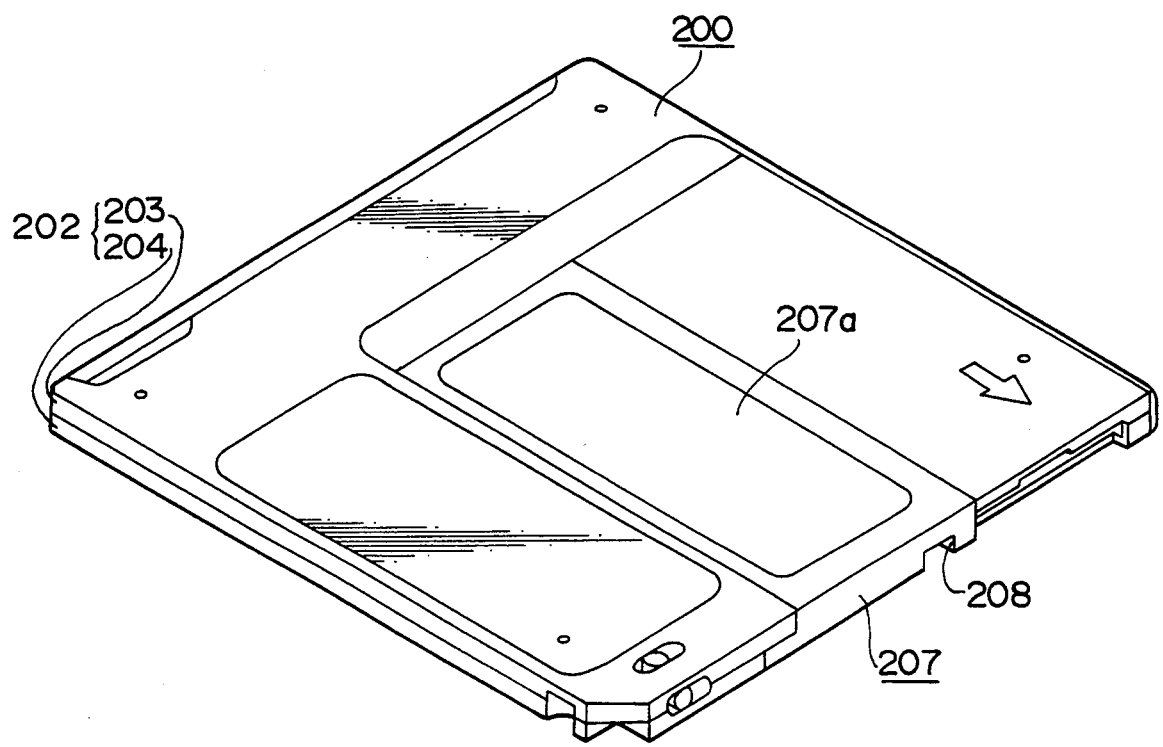
FIG. 15 is a perspective view showing the upper surface of the disc cartridge loaded on an electronic equipment according to the present invention.
Figure 16:
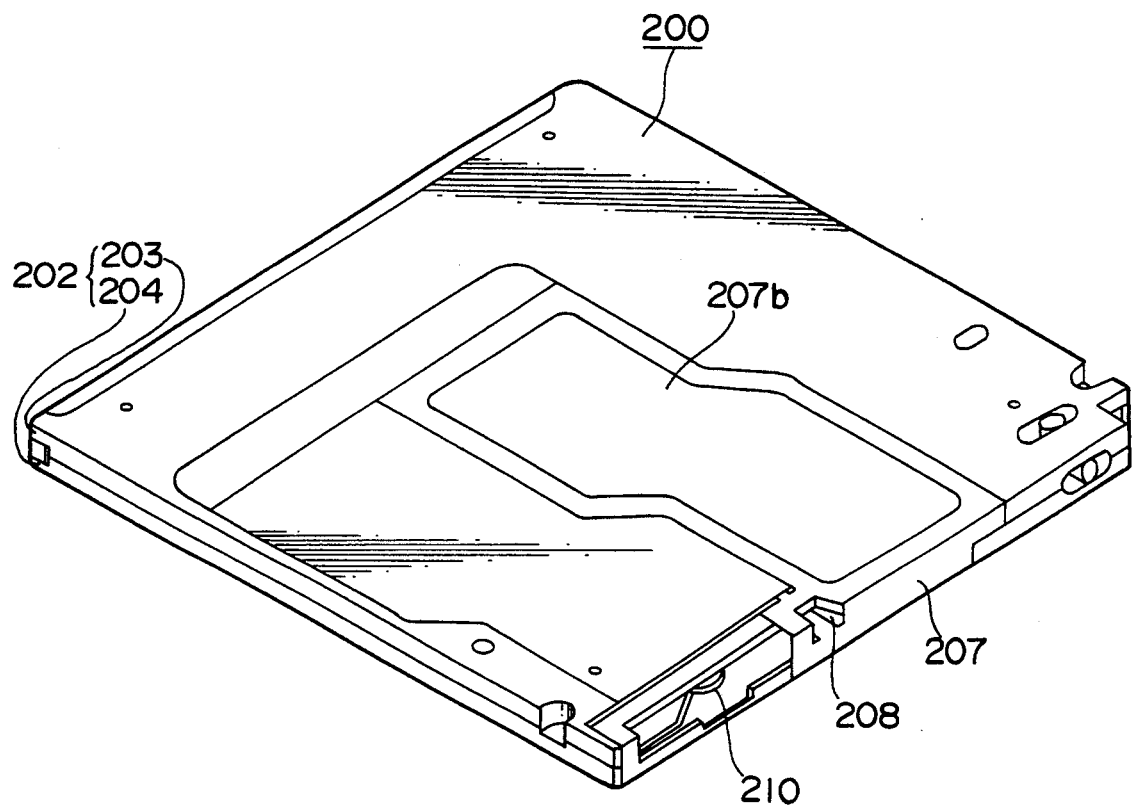
FIG. 16 is a perspective view showing the lower surface of the disc cartridge.
Figure 17:
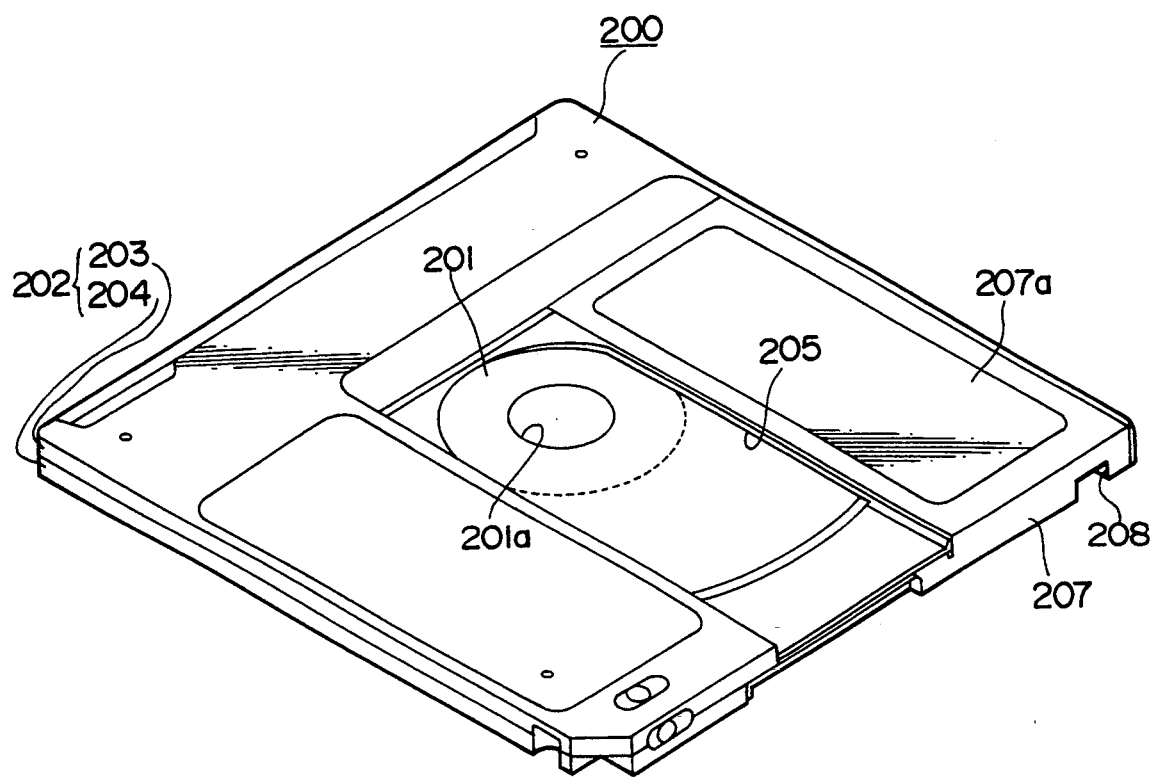
FIG. 17 is a perspective view showing the upper surface of the disc cartridge with the shutter being opened.
Figure 18:
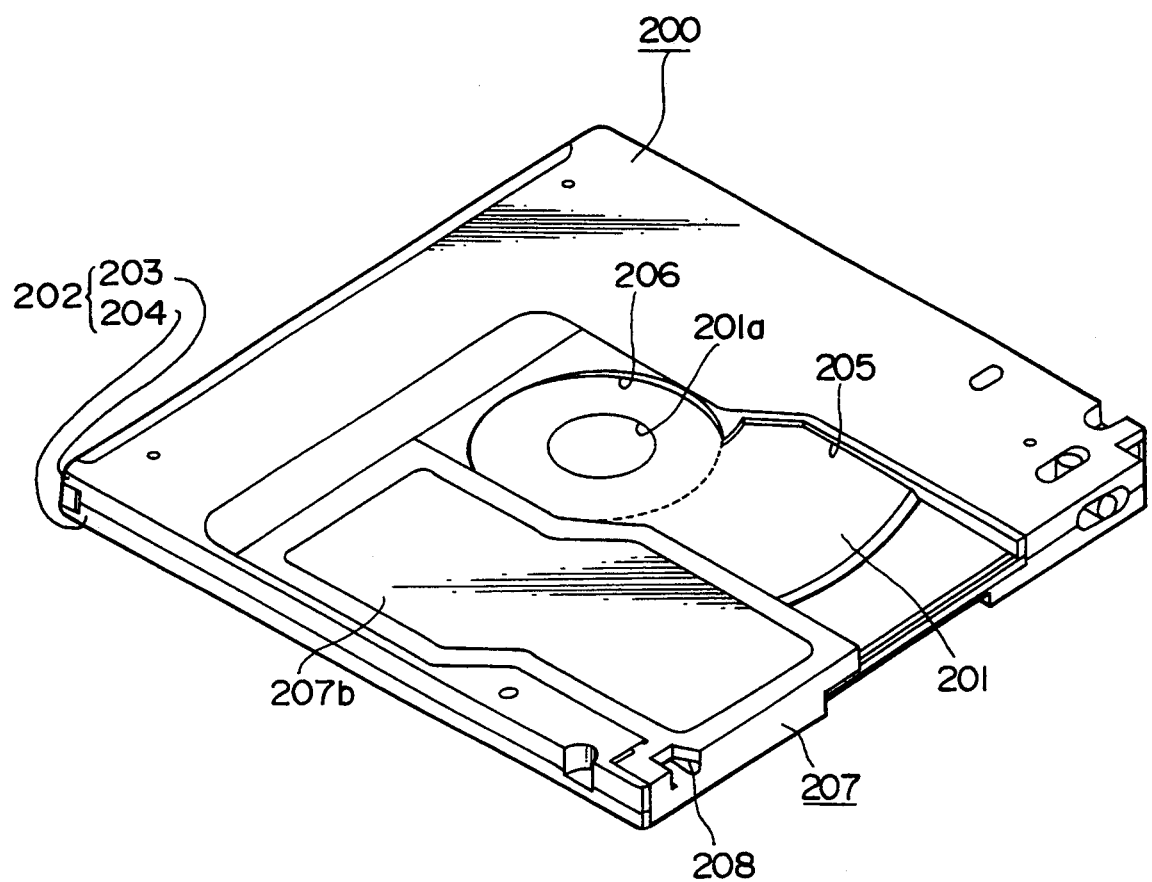
FIG. 18 is a perspective view showing the lower surface of the disc cartridge with the shutter being opened.

The disc cartridge 200 loaded on the disc player of the present invention rotatably accommodates therein the optical disc 201 within a main cartridge body 202 is comprised on an upper half 203 and a lower half 204 abutted and connected to each other as shown in FIGS. 15 and 16. The main cartridge body 202 includes, as shown in FIGS. 17 and 18, an aperture 205 for opening a portion of the signal recording surface of the optical disc 201 outward in the radial direction, and a disc table inserting aperture 206, which is formed at the center of the main cartridge body 202 so as to be contiguous to the aperture 205 to permit the entrance into the disc cartridge of the disc table 8 of the disc rotating-driving device 1 adapted for rotating the disc 201. A shutter 207 is movably mounted on the main cartridge body 202 for closing the apertures 205 and 206 to prevent dust and dirt from being intruded via apertures 205 and 206 into the main cartridge body 202 to contaminate the signal recording surface of the optical disc 201 accommodated therein. This shutter 207 is formed by bending a thin metal plate into the U shape and fitted to the main cartridge body 202 so as to cover the apertures 205 and 206 by an upper cover plate 207a and a lower cover plate 207b. The shutter 207 is biased by a shutter closure spring 210 for closing the apertures 205 and 206 during the non-use time when the disc cartridge 200 is not mounted within the present loading device. On a front web interconnecting the cover plates 207a, 207b of the shutter 207 is formed a pin engaging opening 208 engaged by a shutter opening/closing pin on a shutter opening arm of a shutter opening unit provided on the cartridge holder 25 in which the disc cartridge 200 is mounted, as will be explained subsequently. When the disc cartridge 200 is introduced into the cartridge holder 25, the shutter opening/closing pin is engaged with the pin engaging opening 208. When the disc cartridge 200 is further intruded into the cartridge holder 25, the shutter opening arm is rotated, so that the shutter 207 is moved to follow the rotation of the shutter opening arm against the bias of the shutter closing spring 210. The apertures 205 and 206 are opened, as shown in FIGS. 17 and 18, under the movement of the shutter 207 against the bias of the shutter closure spring 210.

Figure 3:
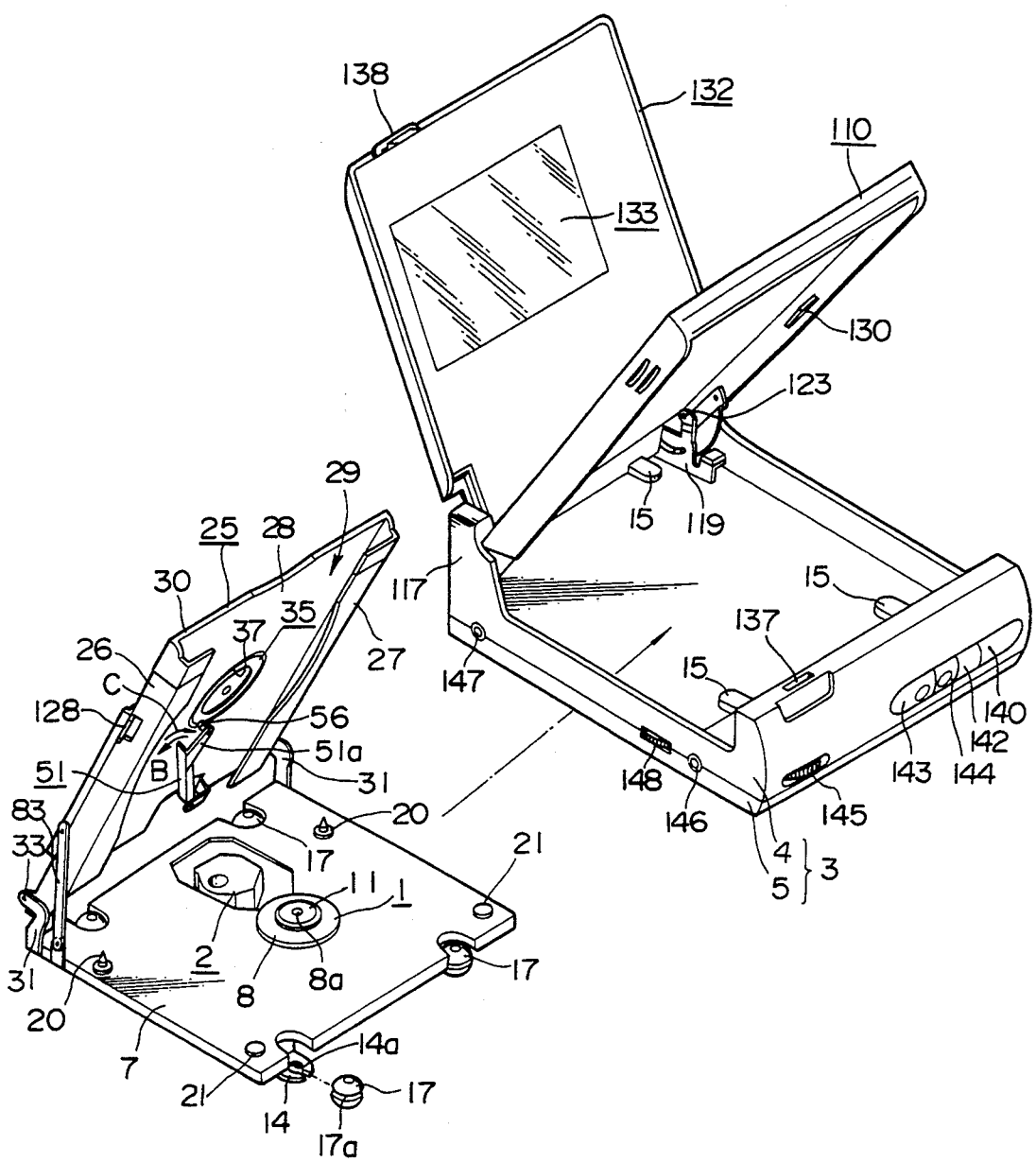
FIG. 3 is an exploded perspective view of the disc player.
Figure 4:
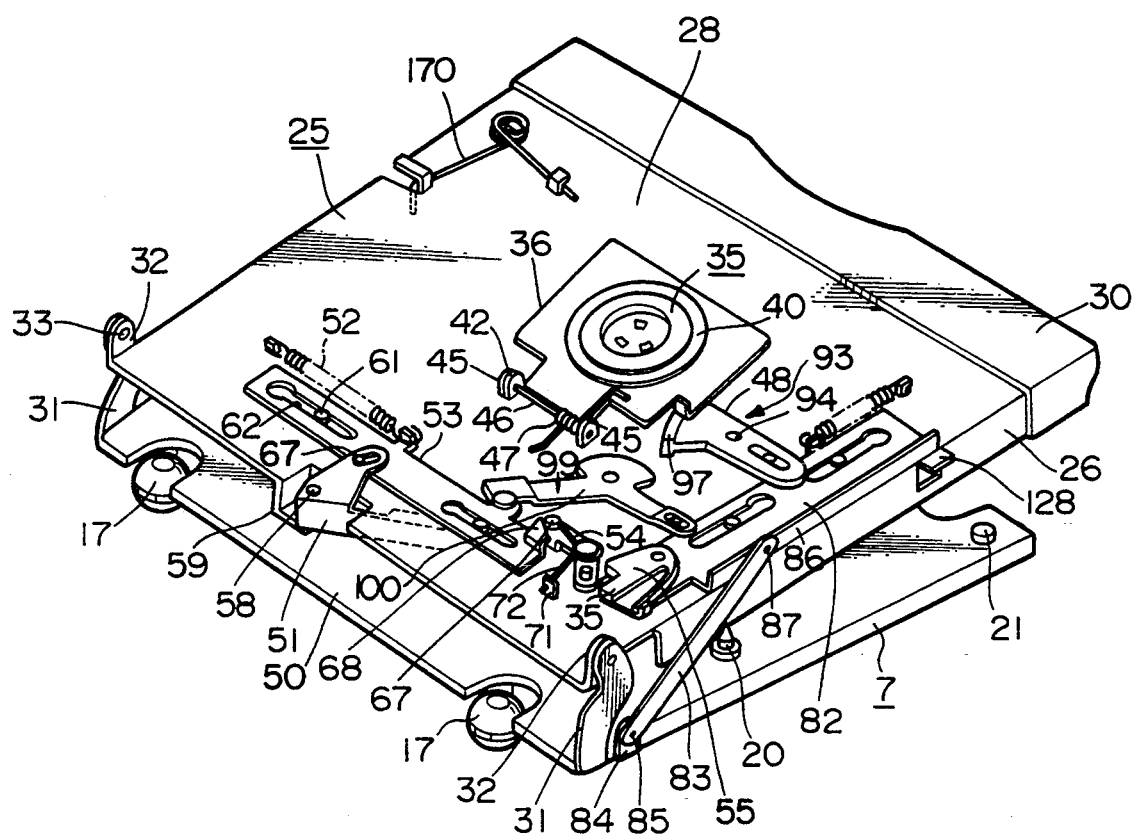
FIG. 4 is a rear-side perspective view showing the cartridge holder.

The cartridge holder 25, into which the above described disc cartridge 200 is inserted and retained, is in the form of a flat box of a size to accommodate the disc cartridge 200, as shown in FIGS. 3 and 4, and is formed on both sides thereof with cartridge supporting sections 26 and 27 for supporting both sides of the disc cartridge 200. These sections 26 and 27 are formed by bending the major surface 28 into the L-shape. The front side opening of the cartridge holder 25, which is perpendicular to these side sections 26, 27, functions as an insertion/removal opening 29 for the disc cartridge 200. On the upper edge of the opening 29, a rest 30 is provided for slightly protruding from the front edge of the cartridge holder 25. This rest 30 is formed as a molded body of synthetic resin, similarly to the main cartridge body 202, and is mounted on the outer front perimeter of the cartridge holder 25 for surrounding the cartridge inserting/removal opening 20. The lower surface of the rest 30 towards the opening 29 is inclined to guide the cartridge 200 as it is introduced into the main cartridge body 25.

The width of the insertion/removal opening 29 is lesser than the dimension of a diagonal line of the disc cartridge 200 inserted into and held by the cartridge holder 25 so that the disc cartridge 200 cannot be inserted into cartridge holder 25 in the oblique position.

The cartridge holder 25 is rotatably supported by having the rear sides opposite to the cartridge inserting/removal opening 29 fulcrumed by a pair of holder mounting pieces 31, 31 provided on both rear sides of the chassis base plate 7. That is, the cartridge holder 25 is supported for rotation relative to the chassis base plate 7 by engaging pivot shafts 33, 33 on the holder mounting pieces 31, 31 in mating engaging openings formed in a pair of upstanding support pieces 32, 32 on both rear sides of the cartridge holder 25.

A disc clamper 35 for clamping the disc placed on the disc table 8 in cooperation with the disc table 8 to cause unitary rotation of the disc with the disc table 8 is mounted at approximately the center of the major surface 28 of the cartridge holder 25. As shown in FIGS. 2 and 4, the disc clamper 35 is supported by a clamper mounting plate 36 rotatably supported on the upper major surface 28 of the cartridge holder 25, and is adapted to be reciprocated into and out of the interior of the disc cartridge 25 by way of an opening 37 in the major surface 28. As shown in FIG. 2, the disc clamper 35 is supported by the clamper mounting plate 36 by having a cylindrical section 39 on the upper surface of the clamper thrust plate 38 thrusting and supporting the optical disc introduced into the clamper mounting plate 36 to prevent the clamper from being extricated from the clamper mounting plate 36 by a flange 40 mounted on the upper end of cylindrical section 39. That is, the disc clamper 35 is loosely supported by the clamper mounting plate 36 for free rotation and for movement axially within the extent of the cylindrical section 39.

A permanent magnet 41 attracted to the disc table formed of a magnetic material such as metal is mounted on the side of the disc clamper 35 opposite to the disc table 8. The purpose of the magnet 41 is to ensure that, when the disc clamper 35 has clamped the optical disc in cooperation with the disc table 8, the optical disc undergoes a positive unitary rotation with the disc table 8. An engaging projection 35a which engages a positioning engaging recess 8a formed at the center of the disc table 8 is provided at the center on the surface of the disc clamper 35 opposite to the disc table 8. When the disc clamper 35 has been attracted to the disc table 8, the engaging projection 35a is engaged with the positioning engaging recess 8a so as to bring the center of rotation of the disc clamper 35 into coincidence with that of the disc table 8.

The clamper mounting plate 36 supporting the disc clamper 35 is formed with a pair of supporting pieces 42, 42 (FIG. 4) having through-holes into which a supporting shaft 46 passed through and supported between a pair of supporting pieces 45, 45 formed integral with the major surface 28 of the cartridge holder 25, so that the plate 36 is supported for rotation relative to the major surface 28 of the cartridge holder 25 with the supporting shaft 46 as the center of rotation. The clamper supporting plate 36 is rotationally biased in the direction shown by an arrow A in FIG. 2 by a torsion coil spring 47 (FIG. 4 5A) wound about the supporting shaft 46 so that the disc clamper 35 is protruded into the interior of the cartridge holder 25.

On the other hand, when the cartridge holder 25 is lifted from the lower position closing the disc loading section 6 to the upper position opening the disc loading section 6, the clamper mounting plate 36 is rotated in the direction opposite to the direction shown by an arrow A in FIG. 2, by a lever 48 (FIGS. 4, 5A) mounted on the upper major surface 28 of the cartridge holder 25, against the bias of the torsion coil spring 47, for withdrawing the disc clamper 35 from the interior of the cartridge holder 25. That is, when the cartridge holder 25 is at the raised position thereby opening the disc loading section 6 so as to enable insertion or extraction of the disc cartridge 200, the clamper mounting plate 36 retracts the disc clamper 35 to a position not obstructing the insertion or extraction of the disc cartridge into and out of the cartridge holder 25.

Figure 5A:
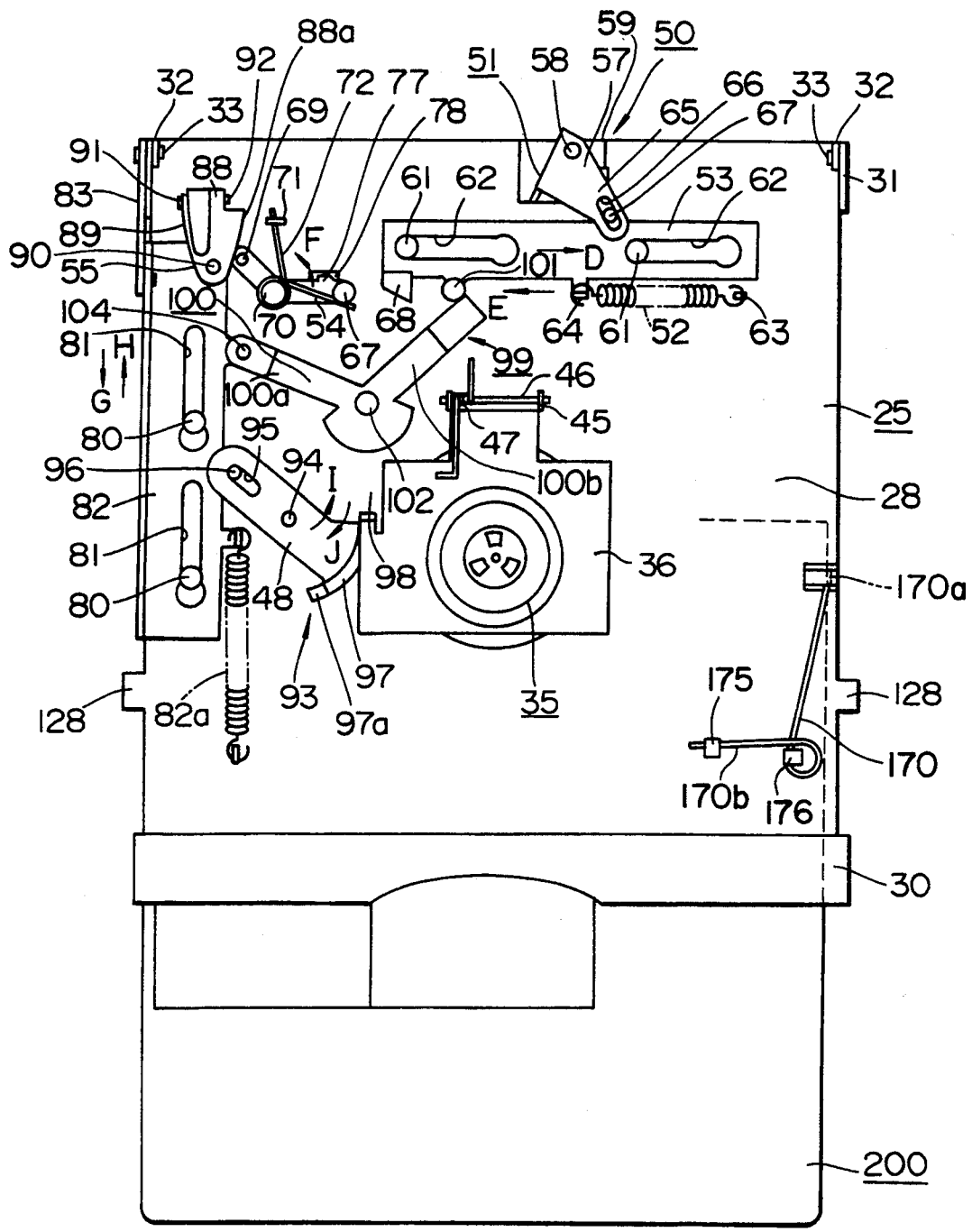
FIG. 5A is a plan view showing a shutter opening unit and the shutter opening and closure section shift unit provided on the upper surface of the cartridge holder.

The cartridge holder 25 is provided with a shutter opening and closure unit 50 for shifting a shutter 207 of the disc cartridge 200 inserted into and held by the cartridge holder 25. The shifted shutter opens the apertures 205 and 206 in the main cartridge body 202 thereby exposing the signal recording surface and the perimeter of a central opening 201a of the optical disc 201 towards outside. Referring to FIGS. 4 and 5A, the shutter opening and closure unit 50 includes a shutter opening arm 51 rotated by the disc cartridge 200 inserted into the cartridge holder 25 for moving the shutter 207 against the bias of a shutter closing spring 210. Unit 50 further includes a shutter opening arm rotating lever 53 biased by a tension spring 52 and adapted for rotating the shutter opening arm 51 to a reset position when the cartridge holder 25 has been rotated to the raised position, together with a locking lever 54 for locking the lever 53 for holding the shutter opening arm 51 at the rotational position opening the shutter 207 of the disc cartridge 200, and an unlocking lever 55 for releasing the locking of the lever 53 by the locking lever 54 by the rotation of the cartridge 25 holder to its raised position.

Referring to FIGS. 3, 4, 5A and 5B, the shutter opening arm 51 has an elongated arm section 51a, on the distal end of which is mounted a shutter opening and closing pin 56. Pin 56 functions to engage a pin engaging opening 208 formed in a shutter 207 of the disc cartridge 200 and on the proximal side of which a fulcrum 57 for the cartridge holder 25 is formed by bending the proximal side. The shutter opening/closing arm 51 has its arm section 51a extending towards the inner side of the cartridge holder 25, so that the shutter opening and closing pin 56 faces the disc cartridge insertion and removal opening 29 of the cartridge holder 25, while the arm 51 also has the fulcrum 57 fulcrumed by a shaft 58 provided on the rear side of the cartridge holder 25, so that the arm 51 may be rotated in the directions shown by arrows 8 and C in FIG. 3, with the shaft 58 (FIGS. 4 and 5A) as the center of rotation.

Meanwhile, the shaft 58 is mounted at an L-shaped bent portion 59 (FIG. 4) at the rear side of the cartridge holder 25. The fulcrum 57 of the shutter opening and closing arm 51 is rotatably mounted by having the shaft 58 passed through a through-hole formed in the fulcrum 57.

The lever 53 (FIGS. 4 and 5A) for rotating the shutter opening arm is mounted, with a pair of slide guide pins 61, 61 provided on the upper major surface 28 of the cartridge holder 25 engaging in elongated through-holes 62, 62 in the lever 53, so as to be slidable within the extent of these through-holes 62, 62. The lever 53 is biased in the direction shown by an arrow D in FIG. 5A by a tension spring 52 installed between a spring retainer 63 formed integrally with the major surface 28 of the cartridge holder 25 and a spring retainer 64 formed integrally with the lever 53.

The shutter opening and closing arm 51 is connected to the lever 53 by having a rotation guide pin 67 provided on the lever 53 engaged in an elongated opening 66 formed in a lever connecting member 65. The shutter opening and closing arm 51, thus connected to the lever 53, is rotationally biased in a direction shown by an arrow C in FIG. 3 under the bias of torsion spring 52 which also biases the lever 53 in a direction shown by an arrow D in FIG. 5A.

Meanwhile, when the cartridge holder 25 has been rotated to a raised position thereby enabling the loading of the disc cartridge 200, the lever 53 for rotating the shutter opening arm is moved under the force of torsion spring 52 in a direction shown by an arrow D in FIG. 5A. As a result, shutter opening and closing arm 51 is kept under the bias of the tension spring 52 and is moved to a position in which the shutter opening and closure pin 56 engages a pin engaging opening 208 (FIG. 15) formed in the shutter 207 of the disc cartridge 200 inserted into the disc cartridge 200.

A locking pawl 68 engaging in a locking pin 67 provided on one end of locking lever 54 is provided on one side of the foremost part of the lever 53. This locking pawl 68 (FIGS. 4, 5A) is engaged with the locking pin 67 when the disc cartridge 200 is introduced into the cartridge holder 25 and the shutter opening and closing arm 51 is rotated by the disc cartridge 200 in the direction shown by an arrow 8 in FIG. 3 for opening the shutter 207. In addition, lever 53 is moved in the direction shown by an arrow E in FIG. 5A to follow the rotation of the shutter opening and closing arm 51 to maintain the lever 53 at a position opposing the bias of the tension spring 52 so as to maintain the shutter opening and closing arm 51 at a position opening the shutter 207.

The locking lever 54 (FIGS. 4, 5A) for locking the rotating lever 53 at the position opposing the bias of the tension spring 52 is chevron-shaped and has the locking pin 67 at one end for engaging with the locking pawl 68 of the lever 53 and a pin 69 at the other end which is thrust by the unlocking lever 55. The locking lever 54 is mounted, with the locking pin 67 facing the locking pawl 68 of the lever 53 and with a supporting shaft 70 on the major surface 28 of the cartridge holder 25 introduced into a central through-hole, not shown, of the locking lever 54, so that the lever 54 may be rotated with the supporting shaft 70 as the center of rotation. The locking lever 54 is rotationally biased in a direction shown by an arrow F in FIG. 5A by a torsion coil spring 72 which is placed about the supporting shaft 70 and has one end retained by the locking pin 67 and the other end retained by a spring retainer 71 formed integrally with the major surface 28 of the cartridge holder 25. The rotational position of the locking lever 54 due to bias by the torsion coil spring 72 is delimited by a rotation delimiting portion on one end of the locking lever 54 engaging in a rotation delimiting opening 78 formed in the major surface of the cartridge holder 25.

The unlocking lever 55 for releasing the locking of the rotating lever 53 by the locking lever 54 as a result of the cartridge holder 25 to the raised position is mounted on a slide lever 82 by having a pair of slide guide pins 80, 80 on the major surface 28 of the cartridge holder 25. Pins 80, 80 are engaged in elongated through-holes 81, 81 of the slide lever 82, as shown in FIG. 5A, so that the slide lever 82 may be slid within the extent of the through-hole 81, 81 in the fore-and-aft direction of the cartridge holder 25 which is at right angles to the movement direction of the lever 53. As shown in FIG. 4, this slide lever 82 is connected to the chassis base plate 7 via a lever 83 by means of which the lever 82 may be slid in the directions shown by arrows 6 and N in FIG. 5A in association with the rotation of the cartridge holder 25. As also shown in FIG. 4, the lever 83 interconnects the slide lever 82 with the chassis base plate 7 by having one end fulcrumed by a supporting shaft 85 on a mounting member 84 provided on one side of the chassis base plate 7 and the other end fulcrumed by a supporting shaft 87 on a mounting member 86 provided on one side of the lever 83.

The unlocking lever 55 (FIG. 5A) mounted on the slide lever 82 is molded from synthetic resin, and is in the form of a letter U, with a pin thrusting arm section 88 for thrusting a pin 69 on the locking lever 54 lying in opposition to a resilient arm section 89. An inclined cam section 88a for thrusting the pin 69 is formed on the outer lateral surface of the pin thrusting arm section 88. The unlocking lever 55 is mounted by having a web section interconnecting the arm sections 88, 89 fulcrumed by a supporting shaft 90 provided on slide lever 82 and by having the ends of the arm sections 89, 88 retained by retainers 91, 92 formed integrally with the slide lever 82. When the slide lever 82 is slid by the rotation to the raised position of the cartridge holder 25, the unlocking lever 55 mounted on the slide lever 82 thrusts the pin 69 by the inclined cam section 88a (FIG. 5A) to rotate the locking lever 54 in a direction opposite to the direction shown by an arrow A in FIG. 5A against the bias of the torsion coil spring 72 for disengaging the locking pin 67 from the locking pawl 68 of the lever 53. The unlocking lever 55 is rotated at this time about supporting shaft 90 of the pin thrusting arm section 88 whilst the resilient arm section 89 is deformed resiliently. Thus the resilient arm section 89 functions as a limiter to permit stable rotation of the locking lever 54.

The cartridge holder 25 is also provided with a unit 93 for bringing the disc clamper 35 into and out of contact with the disc table 8 with the rotation of the cartridge holder 25 between its raised and lowered positions.

This unit 93 operates to rotate the clamper mounting plate 36 in association with the rotation of the cartridge holder 25 to reciprocate the disc clamper 35 supported by the clamper mounting plate 36 into and out of the cartridge holder 25 to bring the disc clamper into and out of contact with the disc table 8, and includes a clamper mounting plate rotating lever 48 connected to the slide lever 82 which is slid as a result of rotation of the cartridge holder 25.

Referring to FIGS. 4 and 5A, the clamper mounting plate rotating lever 48 is mounted by having its central portion fulcrumed by a supporting shaft 94 on the major surface of the cartridge holder 25 and by having rotation guide pin 96 on the slide lever 82 engaged in a rotation guide opening 95 formed in the lever 48. The lever 48 thus mounted on the major surface 48 of the cartridge holder 28 is rotated in the directions shown by arrows I and J in FIG. 5A, about the supporting shaft 94 as the center of rotation, by the sliding movement of the slide lever 82 in the direction shown by the arrows 6 and H in FIG. 5A.

The foremost part of the lever 48 is formed with a clamper mounting plate rotating section 97 for rotating the clamper mounting plate 36 as a result of the rotation of the lever 48. This rotating section 97 is formed as an arc of a circle extending along the direction of rotation of the lever 48. The rotating section 97 is includes an inclined ride guide surface 97a opposite to a ride guide portion 98 formed integrally with the clamper mounting plate 36 and a rotating surface 97b of a predetermined height continuous to the guide surface 97a.

The rotating lever 48 is connected to the slide lever 82 in such a manner that, when the cartridge holder 25 has been rotated to its lower position, the inclined guide surface 97a abuts on and faces to the ride guide portion 98 without the rotating section 97 riding on the guide portion 98 of the clamper mounting plate 36. That is, when the cartridge holder 25 has been rotated to the lowered position, the rotating lever 48 operates in such a manner that the disc clamper 35 is driven towards the disc table 8 to clamp the optical disc in cooperation with the disc table 8.

With the apparatus of the present invention, which permits loading not only of the disc cartridge 200 but also of the optical disc proper, there is provided a shutter arm shift unit 99 for shifting the shutter opening arm 51 to a position of not obstructing the rotation of the optical disc placed on the disc table 8 even if the disc cartridge 200 is not loaded.

The shutter opening arm shift unit 99 is provided with a shutter opening arm shift lever 100 rotated by the rotation of the cartridge holder 25 downward to cause the sliding of the lever 53 in the direction shown by an arrow E in FIG. 5A against the bias of the torsion spring 52. This causes the shutter opening arm 51 to shift in the direction shown by an arrow 8 in FIG. 3. As shown in FIGS. 4 and 5A, the shift lever 100 is made up of an connecting arm section 100a connected to slide lever 82 and a lever operating arm section 100b engaging with a thrust pin 101 provided halfway on the lever 53. By the sliding of the lever 53 in the direction shown by an arrow E in FIG. 5A, the shutter opening arm 51 is rotated in the direction shown by an arrow 8 in FIG. 3 and, when the cartridge holder 25 has been rotated to its lowered position, the shutter opening arm 51 is shifted to a position of not obstructing the rotation of the optical disc placed on the disc table 8.

As can be seen from the drawings (FIGS. 1, 3, and 10A), the dimensions of the cartridge 200 and the dimensions of the main body 3, along the plane of rotation of the disc 201 within the cartridge, are substantially the same.

The disc player according to the present invention is provided with a keyboard cover 111 constituting the first cover in conjunction with the cartridge holder 25.

Figure 6:
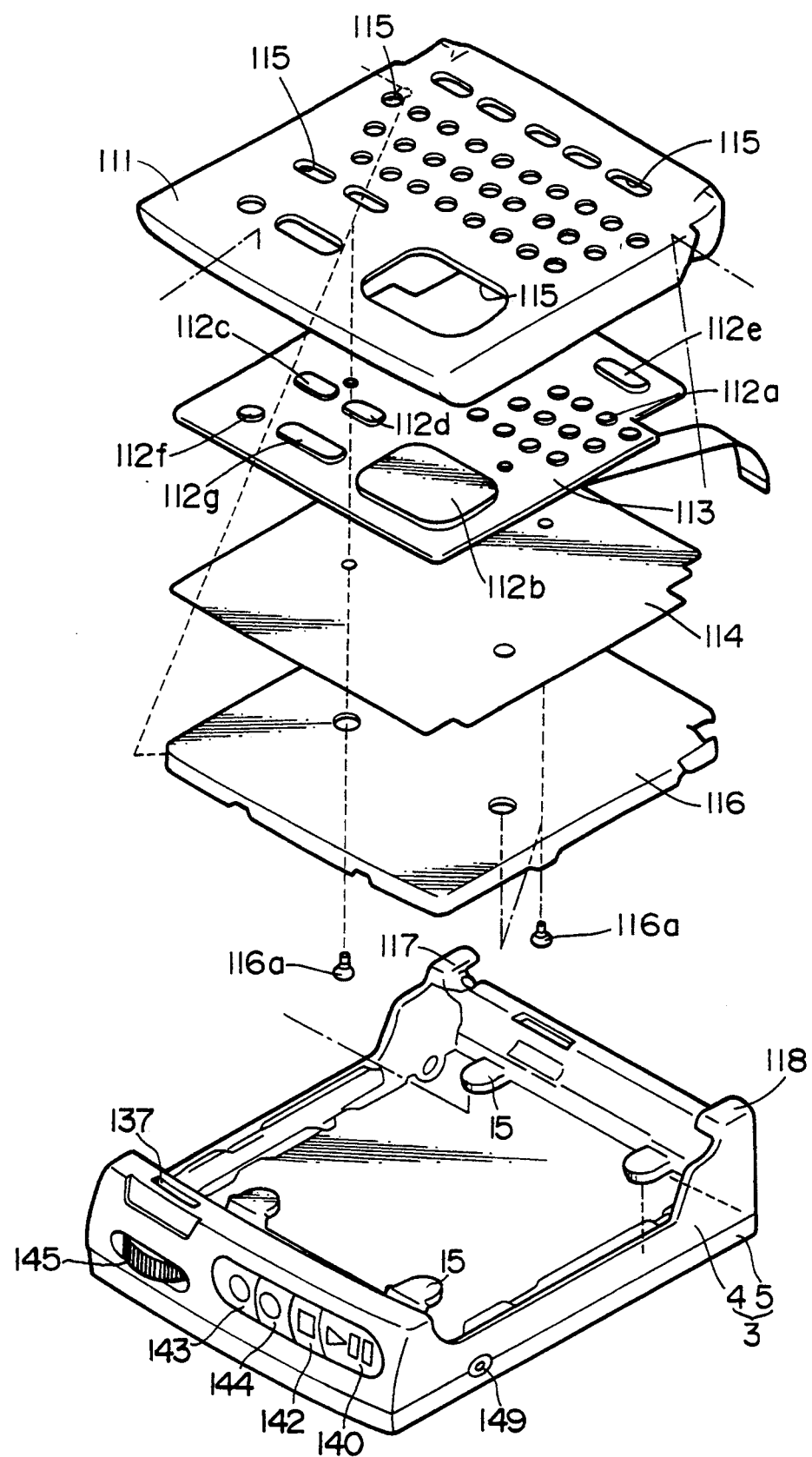
FIG. 6 is a perspective view of the keyboard cover.

Referring to FIG. 1, the surface of the keyboard cover 111 faces upwards when the keyboard cover is lowered to cover the disc loading section 6 which is located on the upper surface of the main body 3. Keyboard cover 111 is provided with an operating section carrying an array of operating keys 112 adapted for controlling the read-out operation of information signals recorded on the optical disc loaded on the disc loading section 6 for reading out and reproducing the desired information from the optical disc. As shown in FIG. 6 this operating section is includes a resilient operating keyboard membrane 113 carrying a large number of operating keys 112 resiliently deviated when depressed, and a key switch mounting plate 114, which is a printed circuit board carrying a switching section which may be turned on and off by depressing the operating keys 112. The operating keyboard membrane 113 is mounted on the inner surface of the keyboard cover 111. The operating keys 112 are passed through through-holes 115 formed in the keyboard cover 111 so as to protrude above the upper surface of the keyboard cover 111. The key switch mounting plate 114 is mounted on the inner surface of the keyboard cover 111 so as to be superimposed on the operating keyboard membrane 113. The operating keyboard membrane 113 and the key switch mounting plate 114 are fixedly supported by a cover plate 116 mounted on the inner surface of the keyboard cover 111 so as to cover the board 113 and the mounting plate 114. The cover plate 116 is secured by set screws 116a to the keyboard cover 111.

The operating keys 112 constituting the operating section include alphabet keys 112a displaying alphabetical letters, a cursor shift key 112b for shifting a cursor pointing to one of a plurality of select data items read out from the optical disc 201 so as to be displayed on a display section as described later, a plurality of selection keys 112c, 112d for selecting the selected data item pointed to by the cursor shifted by the operation of the cursor shift key 112b, a plurality of function select keys 112e for selecting the data readout function of the disc layer, and character display changeover keys 112f, 112g.

Figure 7:
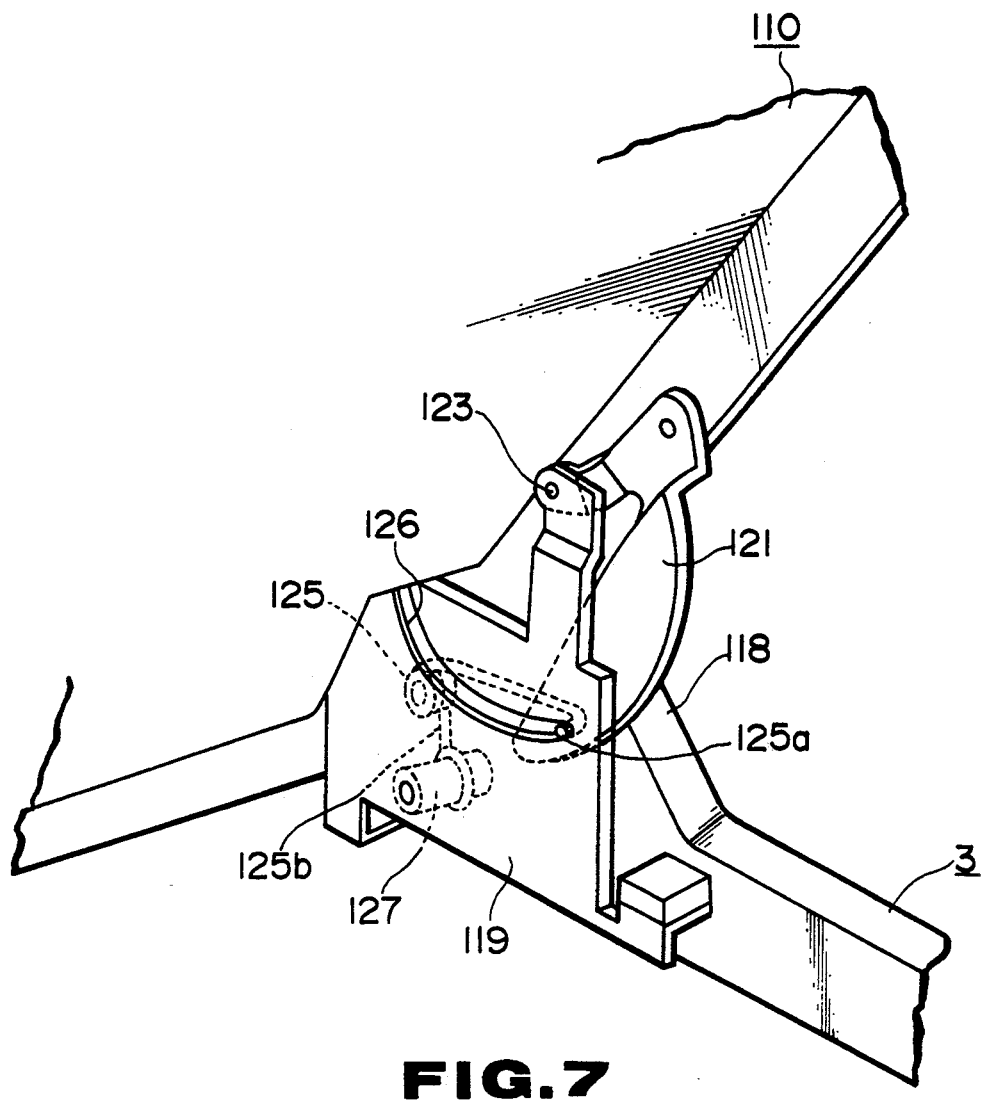
FIG. 7 is a partial perspective view showing the first cover attached to the main body of the disc player.

Referring to FIGS. 1, 3 and 7, the keyboard cover 111 having the operating section comprised of an array of the operating keys 112 on its upper surface is mounted for rotation relative to the main body 3 by having rotation supporting plates 121, 121 (FIGS. 2 and 7) or both rear sides fulcrumed by supporting shafts 123, 123 on supporting plates 119, 119 on the opposing inner surfaces of the cover mounting sections 117, 118 on both rear sides of the cabinet 4 of the main body 3, with the keyboard cover 111 being closed upon the upper surface of the cartridge holder 25 supported by the main body 3. For positively holding the closure position and the opening position of the keyboard cover 111 relative to the main body 3, a toggle spring 125 is interposed between one of the supporting plates 119 and the rotation supporting plate 122. As shown in FIG. 7, the toggle spring 125 is mounted by having the foremost part of one of the arm sections 125a engaged in an opening 126 formed in the rotation supporting plate 122 of the keyboard cover 111 and by having the foremost part of the other arm section 125b retained by a retention pin 127 of the supporting plate 119. When the keyboard cover 111 is rotated to the opening position or closure position relative to the main body 3, the keyboard cover 111 is rotationally biased towards these positions, by the provision of the toggle spring 125, to maintain the cover in either position.

The cartridge holder 25 is connected to the keyboard cover 111 so as to be rotated along with the keyboard cover 111. Referring to FIGS. 2 and 3, the cartridge holder 25 is connected to the keyboard 111 by having engaging pieces 130, 130 (FIG. 3) on both opposing inner sides of the keyboard cover 111 engaged with mating engaging pieces 128, 128 on both sides of the major surface 28 of the cartridge holder 25. The keyboard cover 111 and the cartridge holder 25 thus mounted in a mutually superimposed manner on the main body 3 constitute a first cover 110 which is rotated in unison by the rotating operation of the keyboard cover 111. That is, during closure, the first cover 110 is rotated in unison, with the keyboard cover 111 superimposed on the cartridge holder 25. During during opening, the cartridge holder 25 is rotated to follow the keyboard cover 111, with the engaging pieces 130, 130 engaging with the mating engaging pieces 128, 128.

Although the disc player of the present invention is provided with the cartridge holder 25 to provide for loading of the disc cartridge 200, it is unnecessary to provide the cartridge holder 25 if the optical disc proper is used as the recording medium. In this case, the disc clamper 35 adapted for clamping the optical disc in cooperation with the disc table 8 may be mounted directly on the inner surface of the keyboard cover 111. In this case, the first cover 110 is constituted only by the keyboard cover 111.

The main body 3 constituting the electronic equipment of the present invention is fitted with a second cover 132 operating as an outer cover.

Figure 8:
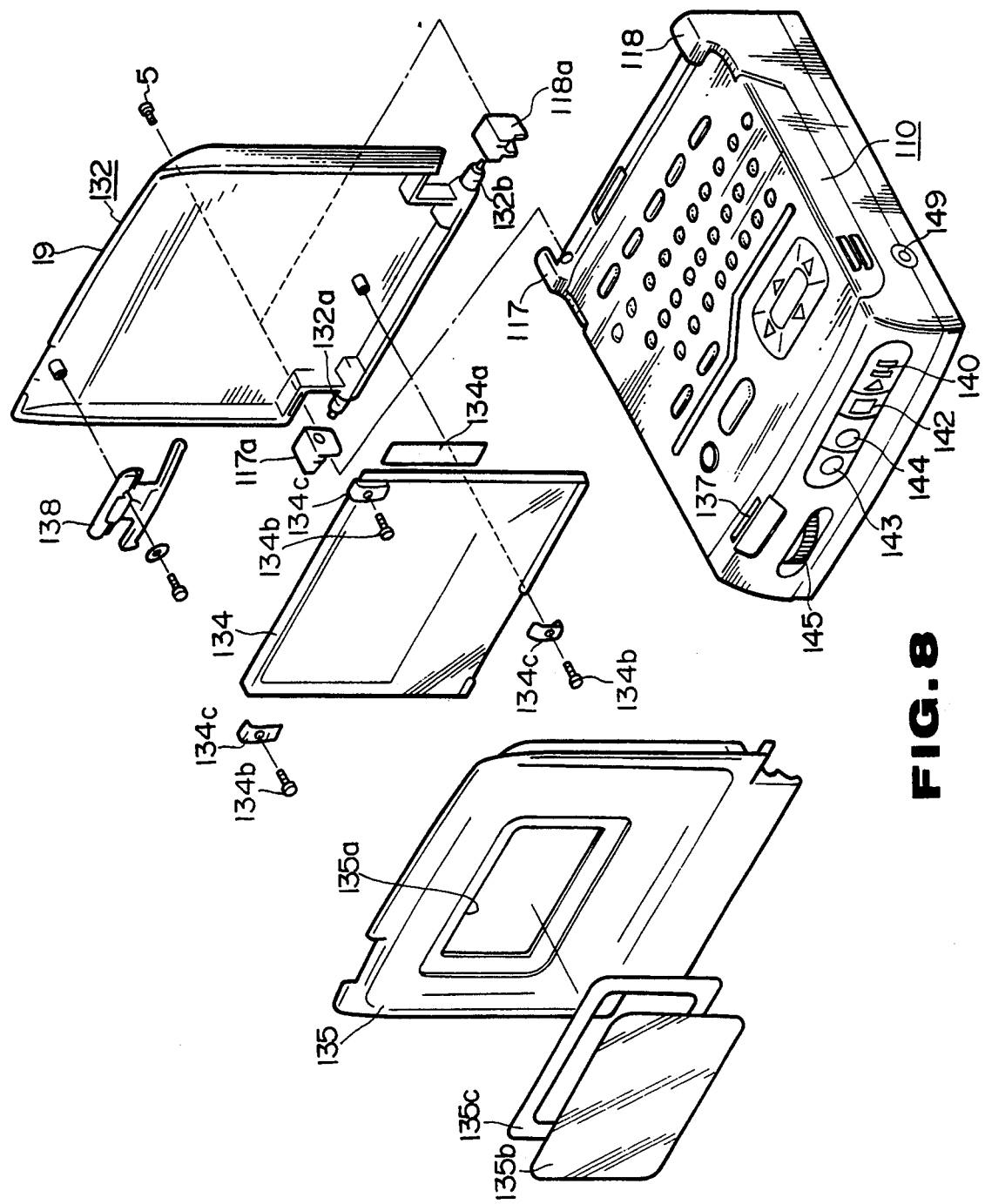
FIG. 8 is a perspective view of the display section.

The second cover 132 functions as a display panel for displaying the information read out and reproduced from the optical disc loaded in the electronic equipment according to the present invention. Thus a display section 133 is provided on the inner surface of the second cover 132, as shown in FIGS. 1 and 2. This display section 133 is constituted by a display panel 134 formed by, for example, a liquid crystal display device or LCD arranged on the inner lateral surface of the second cover 132. This display panel 134 is secured to the inner surface of the second cover 132 by a metal fitting 134c secured to the second cover 132 by an adhesive sheet 134a and a set screw 134b as shown in FIG. 8. The display panel 134 is covered by a display panel cover plate 135 having an opening 135a in register with the display portion of the panel 134. A transparent plate 135b, such as a glass plate, is placed over the opening 135a by the interposition of an adhesive sheet 135c.

Referring to FIGS. 1 and 2, the second cover 132 is rotatably supported on the opposing upper inner lateral sides of upright brackets 117, 118 on the rear side of the cabinet 4 by which the first cover 110 is fulcrumed, with the second cover 132 being closed upon the first cover 110 rotatably supported by the main body 3.

That is, the second cover 132 is mounted by having the narrow proximal side fitted to the brackets 117, 118, and is rotatably mounted on the cabinet 4 by having friction pins 132a, 132b on the proximal side thereof fulcrumed by bearings 117a, 118a provided on the brackets 117, 118. By these friction pins 132a, 132b, the second cover may be maintained at any desired angular position.

On one front side of the second cover 132, there is provided a locking member 138 engaging with a locking portion formed in the main body 3. By such locking portion 138, the second cover 132 superimposed on the first cover 110 to cover the main body 3 may be maintained reliably in the closure position. By closing and locking only the second cover 132 on the uppermost side, the first cover 110 and the cartridge holder 25 interlocked with the first cover 110 may be positively maintained at the closure position to prevent inadvertent opening.

On the front surface of the main body 3, there are provided a start/stop button 140, operating as a power source switch for on/off control of the power source of the disc player in its entirety, a playback key 142 for designating the playback of an audio optical disc 220 which is utilized when the optical disc 220 is loaded in the disc player, a fast feed key 143 for designating fast feed in the forward direction, a reverse fast feed for designating the fast feed 144 in the reverse direction, and a sound volume adjustment key 145.

On one lateral surface of the main body 3, there are provided a jack 146 for outputting audio signals, a jack 147 for inputting an external power source and a contrast adjustment knob 148 for display panel 134, as shown in FIG. 1. On the other lateral surface of the main body 3, there is provided a jack 149 for outputting video signals, as shown in FIG. 8.

The loading of the disc cartridge 200 to the above described disc player is hereinafter explained.

Figure 5B:
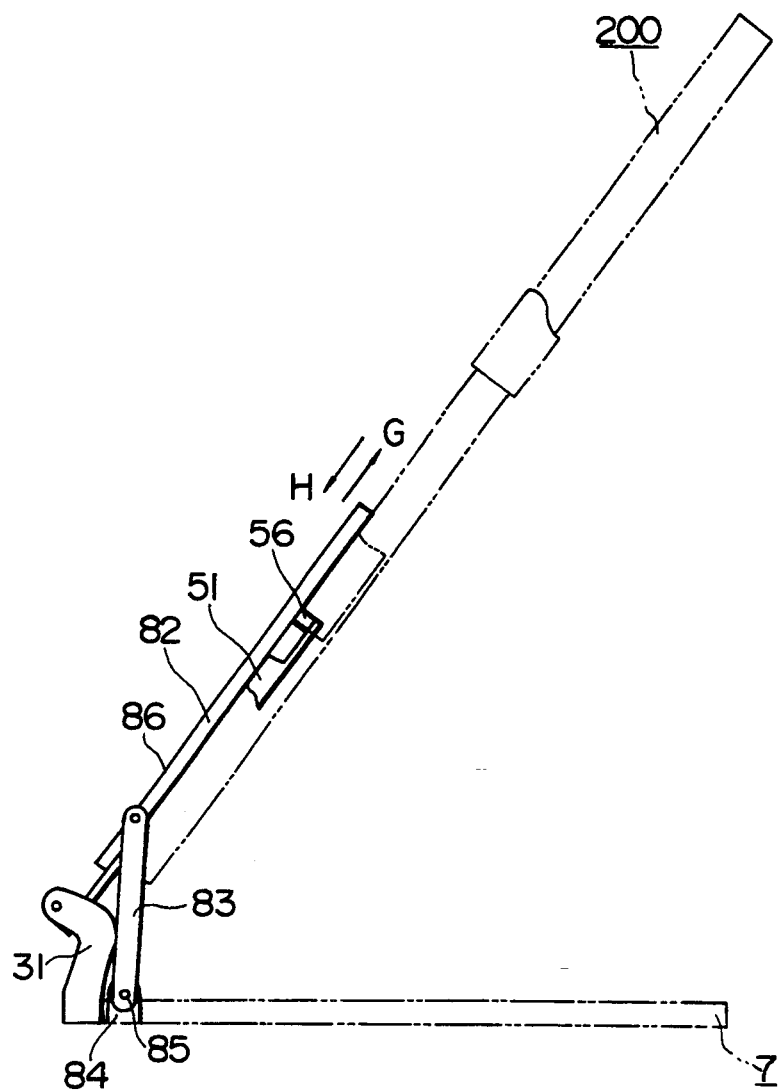
FIG. 5B is a diagrammatic side elevation showing the cartridge holder rotated to the raised position.

For loading the disc cartridge 200, the locking member 138 is operated to release the locking of the second cover 132 with respect to the main body 3 to open the second cover 132. The first cover 110 is then opened, and the cartridge holder 25 is brought to its raised position in which the cartridge holder 25 is spaced apart from the disc loading section 6, as shown in FIGS. 1 and 5B. With the cartridge holder 25 thus rotated to its raised position, the lever 53 has been shifted in the direction shown by an arrow D in FIG. 5A, under the bias of the torsion spring 52. The shutter opening and closing arm 51 is rotated towards the disc clamper 35, as shown in FIG. 3, and the shutter opening and closing pin 56 is at a position facing the pin engaging opening 108 formed in the shutter 207 of the disc cartridge 200 introduced into the disc cartridge 25.

When the disc cartridge 200 is introduced into the cartridge holder 25 by way of the cartridge inserting and removal opening 29, with the shutter 207 directed inward, the shutter opening and closure pin 56 is engaged in the pin engaging opening 108 of the shutter 207. When the disc cartridge 200 is further introduced into the inside of the cartridge holder 25, starting from the state in which the shutter opening and closing pin 56 is engaged in the pin engaging opening 208 of the shutter 207, the shutter opening arm 51 is thrust by the disc cartridge 200 and thereby rotated in the direction shown by an arrow 8 in FIG. 5A, with the fulcrum 57 as the center of rotation. By such rotation of the shutter opening arm 51 in the direction shown by an arrow 8 in FIG. 5A, the shutter 207 of the disc cartridge 200 is moved in the direction of opening the apertures 205 and 206 in the main cartridge body 200 against the bias of the shutter closing spring 210.

Figure 9A:
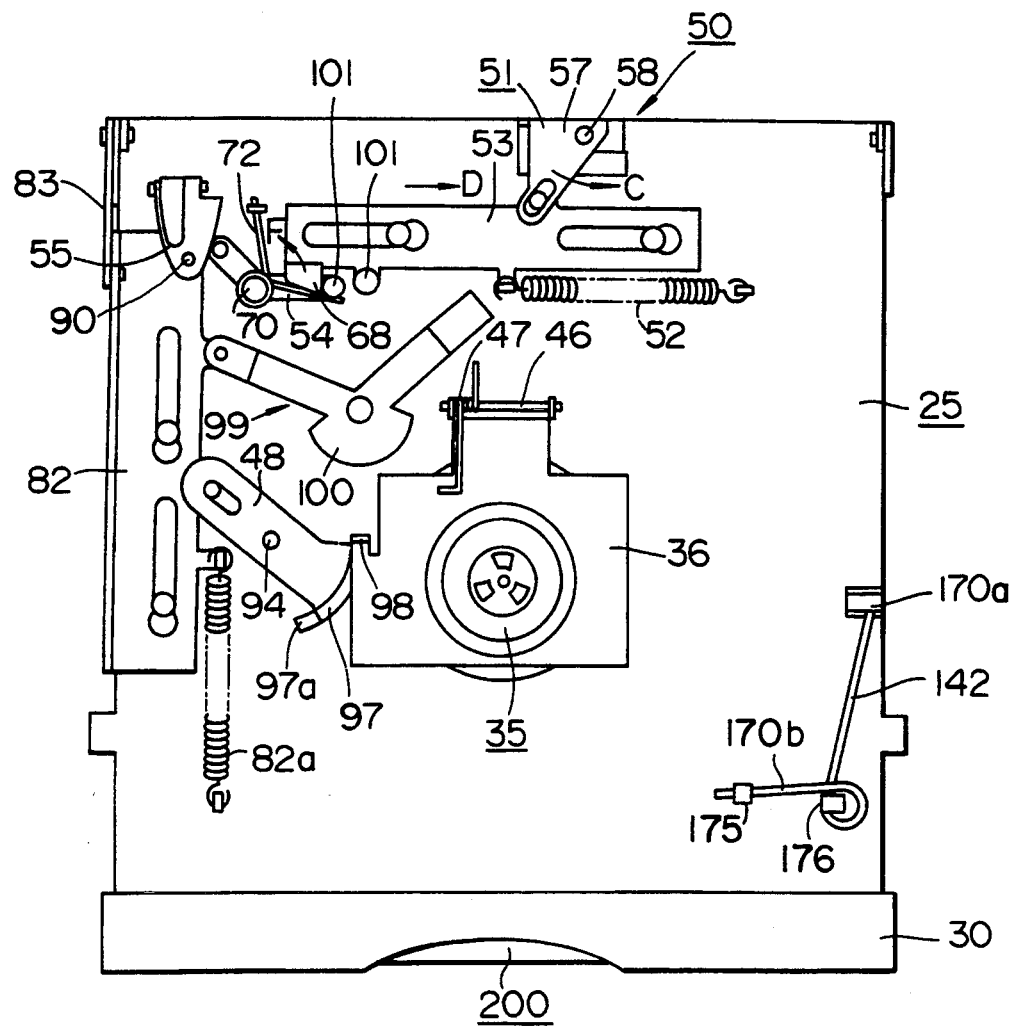
FIG. 9A is a plan view showing the disc cartridge inserted into and held by the cartridge holder.
Figure 9B:
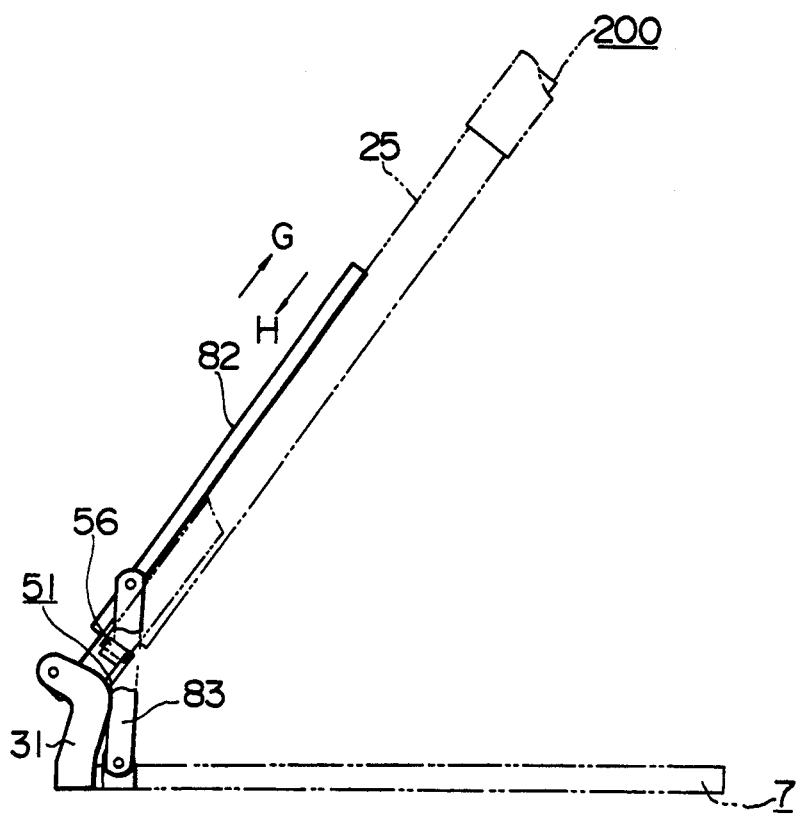
FIG. 9B is a diagrammatic side elevation showing the rotational position of the cartridge holder relative to the chassis base plate with the disc cartridge inserted into and held by the cartridge holder.

When the shutter opening arm 51 is rotated by the insertion of the disc cartridge 200, the lever 53 is slid under the force of rotation of the shutter opening arm 51 in the direction shown by an arrow E in FIG. 5A against the bias of the tension spring 52. When the disc cartridge 200 has been inserted fully into the inside of the cartridge holder 25, as shown in FIGS. 9A and 9B, the shutter 207 is rotated by the shutter opening arm 51 to a position of fully opening the apertures 205 and 206. At this time, the shutter opening arm 51 reaches a state in which it has been rotated to the rear end of the cartridge holder 25 and the lever 53 shifted by the shutter opening arm 51 operates to maintain the shutter opening arm 51 at the position of opening the shutter 207, with the locking pawl 68 engaging with and locking the locking pin 67 of the locking lever 54, as shown in FIG. 9A. At this time, the cartridge holder is kept at its raised position, without being rotated, while the slide lever 82 is also not slid, the lever 83 not being rotated, as shown in FIG. 9A.

The disc cartridge 200 is retained within the cartridge holder 25, under the supporting force from the shutter opening and closure arm 51, since the lever 53 is locked by the locking lever 54 and the arm 51 holds the shutter in the opened position.

When the first cover member 110 is rotated from the state in which the disc cartridge is inserted and the shutter 207 is opened in a direction towards the disc loading section 6 of the main body 3, the cartridge holder 25 is also rotated towards below in a direction approaching the disc loading section 6. When the cartridge holder 25 is rotated to a lowered position towards the disc loading section 6, the disc table 8 is introduced into the main cartridge body 202 by way of the opened aperture 206. The optical disc 201 accommodated in the main cartridge body 202 is then positioned on the disc table 8. At this time, with the optical disc 201 positioned on the disc table 8 with its central opening engaged by the centering member 11 for assuring centering of the disc relative to the disc table 8. The disc cartridge 200 is loaded on the disc loading section 6 whilst it is positioned both horizontally and vertically by the positioning pins 20 and the height setting pins 21 provided on the chassis base plate 7.

Figure 10A:
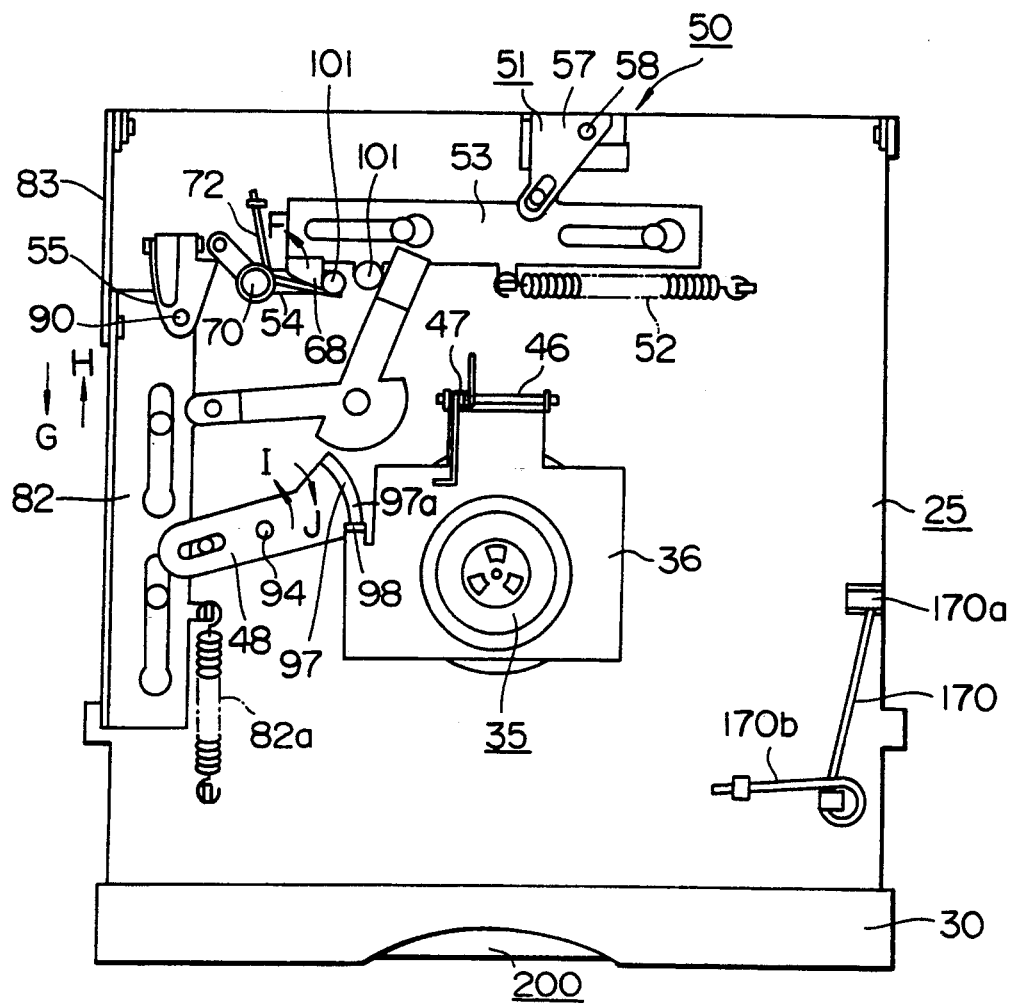
FIG. 10A is a plan view showing the state in which the cartridge holder accommodating the disc cartridge has been rotated towards the disc loading section.

On the other hand, when the cartridge holder 25 has been turned in the lower direction towards the disc loading section 6, the slide lever 82 is slid in the direction shown by an arrow 6 in FIGS. 10A and B by means of lever 83. The slide lever 82 is biased at this time by tension spring 82a in the direction shown by an arrow 6 in FIG. 10A and hence may be slid positively in the direction shown by an arrow 6 in FIG. 10A.

When the slide lever 82 is slid in the direction shown by an arrow 6 in FIG. 10A, the rotating lever 48 connected to the slide lever 82 is rotated in the direction shown by an arrow I in FIG. 10A with the supporting shaft 94 as the center of rotation. When the lever 48 is thus rotated, the rotating section 97 for retaining the clamper mounting plate 36 in the raised rotational position is extricated from the clamper mounting plate 36, as shown in FIG. 10A, for releasing the raised rotating state of the clamper mounting plate 36. With the rotational state by the rotating section 97 being thus released, the clamper mounting plate 36 is rotated in the direction shown by an arrow A in FIG. 2, under the bias of the torsion coil spring 47, for inserting the disc clamper 35 into cartridge holder 25. The disc clamper 35 is attracted towards the disc table 8, under the magnetic attraction by the magnet 41, for clamping the optical disc 201 on the disc table 8 in cooperation with the disc table 8, as shown in FIG. 9, for enabling the optical disc 201 to be rotated in unison with the disc table 8.

With the disc player of the present invention, an optical disc 220 not accommodated in the disc cartridge 200 may be loaded in the disc loading section 6.

That is, with the disc player according to the present invention, when the first cover 110 is in opened state, the disc loading section 6 located on the upper surface of the main body 6 is exposed.

Figure 12:
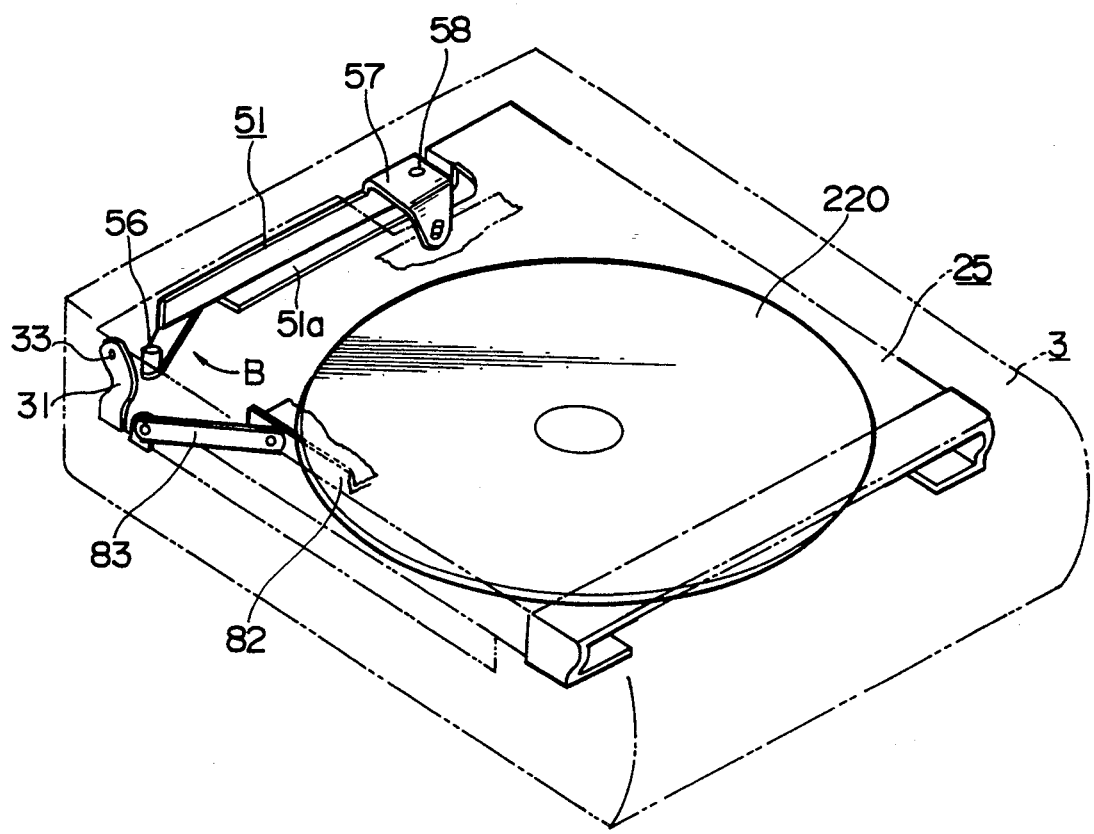
FIG. 12 is a perspective view showing the state in which the optical disc proper is loaded on the disc loading section and the cartridge holder is rotated towards the disc loading section.

The optical disc 220 is loaded on the disc table 8 provided in the disc loading section 6. When the first cover 110 is rotated in the direction of closing the disc loading section 6 of the main body 3, the cartridge holder 25 is also rotated towards the lower position of closing the disc loading section 6. When the cartridge holder 25 is rotated towards its lower position, the slide lever 82 is slid in the direction when by an arrow 6 in FIG. 10A, by means of the lever 83, as in the case of loading the disc cartridge 200, as explained previously. With the sliding of the slide lever 82, the lever 53 is slid in the direction shown by an arrow E in FIG. 10A against the bias of the tension spring 52. In association with the sliding of the lever 53, the shutter opening arm 51 is rotated in the direction shown by an arrow 8 in FIG. 12, with the fulcrum 57 as the center of rotation. The first cover 110 inclusive of the cartridge holder 25 is rotated until it is closed upon the disc loading section 6. The shutter opening and closing arm 51 in its entirety, inclusive of the shutter opening and closure pin 56, is thus moved away from the optical disc 220 placed on the disc table 8, that is, to a position not obstructing the rotation of the optical disc 201, as shown in FIG. 12.

When the closure state of the first cover 110 is reached, in which the shutter opening and closing arm 51 is moved to a position not obstructing the rotation of the optical disc 201, the lever 53 operates to maintain the shutter opening and closing arm 51 at a position of not obstructing the rotation of the optical disc 220, with the locking pawl 68 being engaged and locked by the locking pin 67.

When the first cover 110 including the cartridge holder 25 has been rotated towards the closed position over the disc loading section 6, the lever 48 connected to the slide lever 82 by means of lever 83 is rotated in the direction shown by an arrow I in FIG. 10A. The disc clamper 35 is introduced into the interior of the cartridge holder 25 as in the case of loading the disc cartridge 200 as mentioned previously for clamping the optical disc 201 placed on the disc table 8 in cooperation with the disc table 8 to enable the disc to be rotated in unison with the disc table 8.

The state of reading out and reproducing desired information signals from the optical disc 201 in the disc cartridge 200 or from the optical disc 220 after the loading of the disc cartridge 200 or the optical disc 220, is hereinafter explained.

Figure 13A:
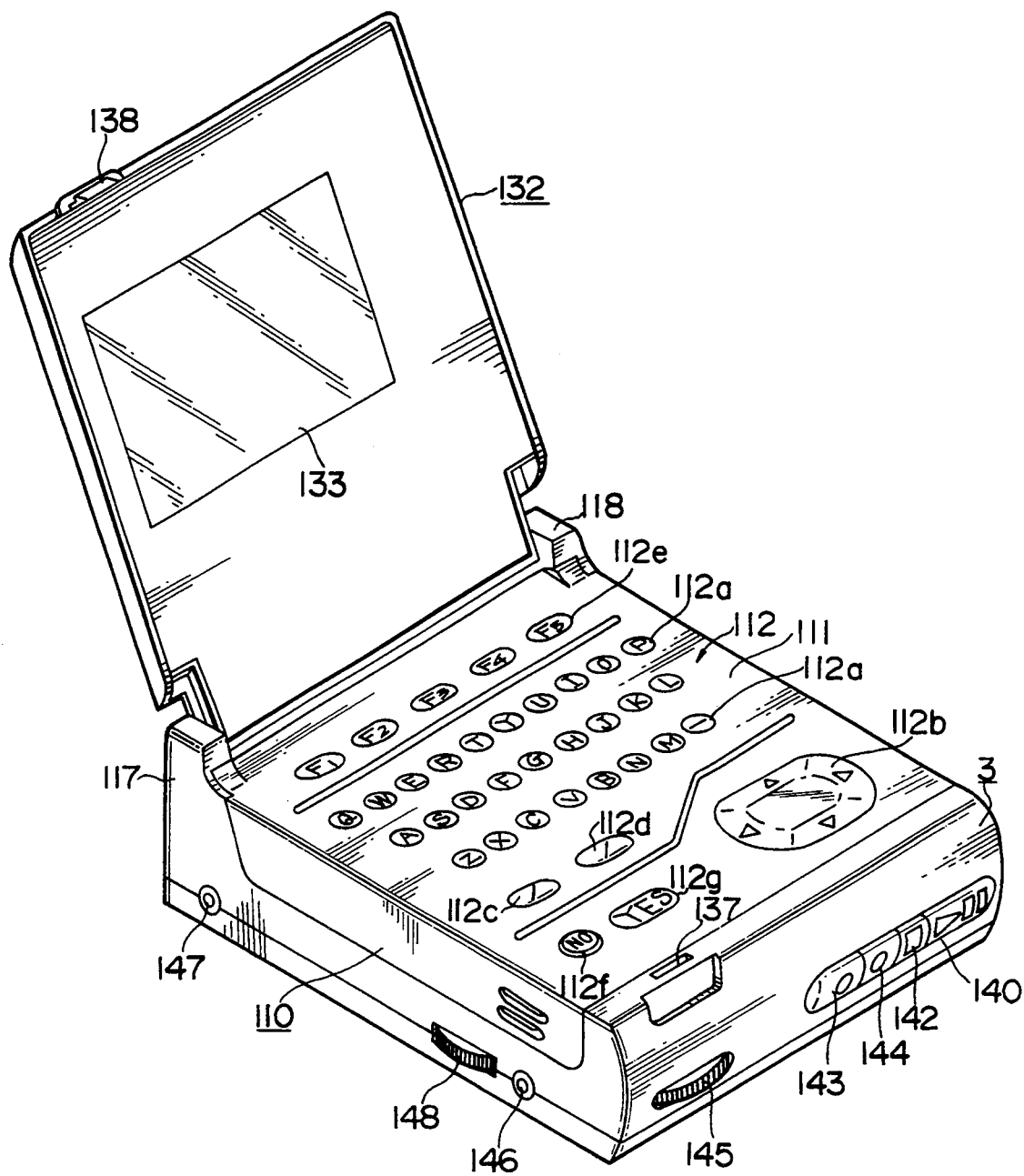
FIG. 13A is a perspective view of the disc player when in use, and in the state of reading out and reproducing information signals.
Figure 13B:
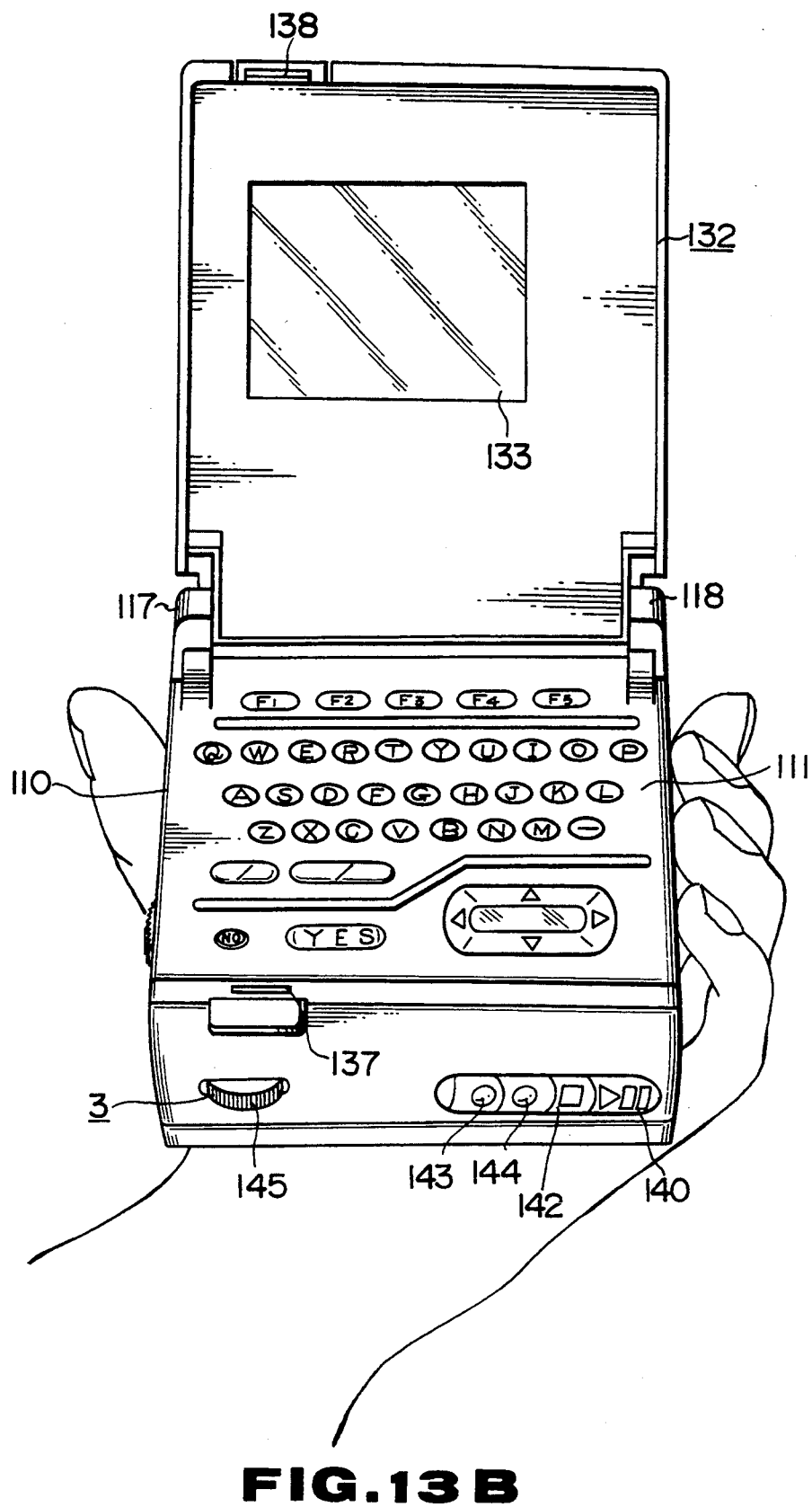
FIG. 13B is a perspective view showing the state in which the disc player is placed on the palm of the hand when in use.
Figure 14:
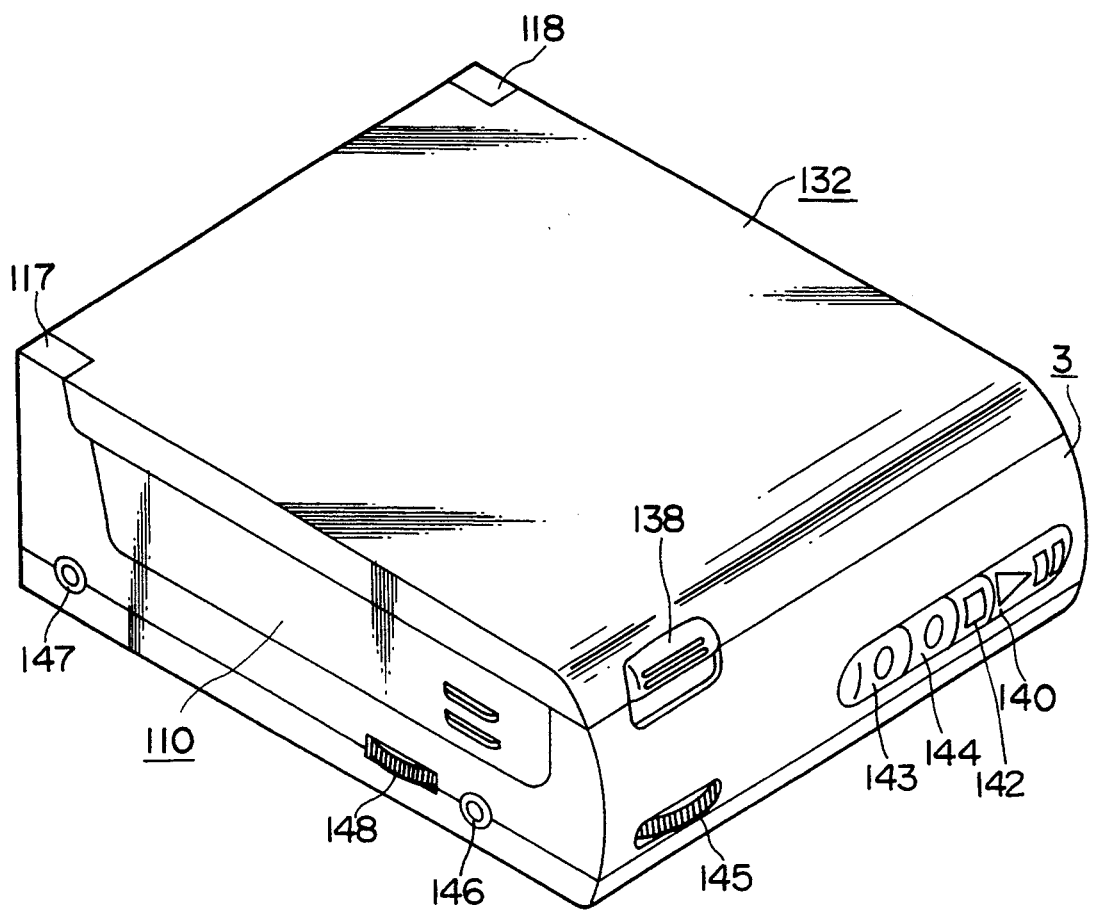
FIG. 14 is a perspective view of the disc player when out of use, with the first and second covers closed upon the main body of the disc player.

When the disc cartridge 200 or the optical disc 220 is loaded in the disc loading section 6, the first cover 110 covers the disc loading section 6 to close the main body 3, as shown in FIG. 13A. At this time, the keyboard which includes key array 112 on the upper surface of the first cover 110 is exposed at the upper surface of the main body 3. At this time, the second cover 132 is rotated and set at a suitable angle so that the display section 133 provided on the inner surface of the second cover 132 is opened to outside, as shown in FIG. 13A.

The start-stop button 140 on the front side of the main body 3 is actuated to start the rotation of the optical disc 201 to enable the information signals recorded on the optical disc 201 to be read out and reproduced. The operating key 112 on the keyboard 113 is also actuated to read out the desired information. The desired information read out and reproduced from the optical disc 201 is then displayed as image information on the display section 133 of the second cover 132. The disc player may be used when held in the palm of the hand, even when the second cover member 132 is opened for use, as shown in FIG. 13A.

Figure 10B:
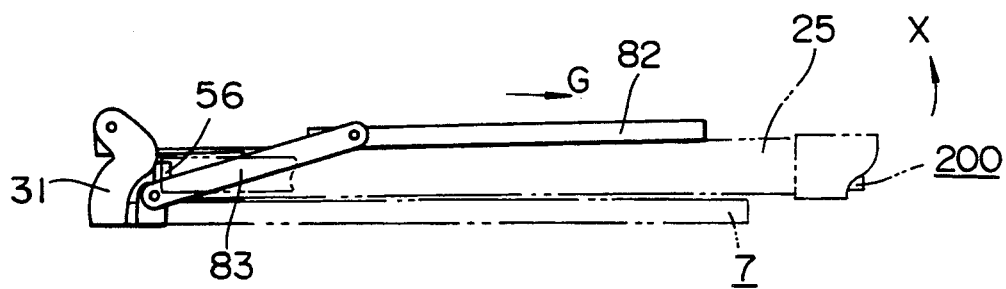
FIG. 10B is a diagrammatic side elevation showing the rotational position with respect to the chassis base plate of the cartridge holder being rotated towards the disc loading section.
Figure 11:
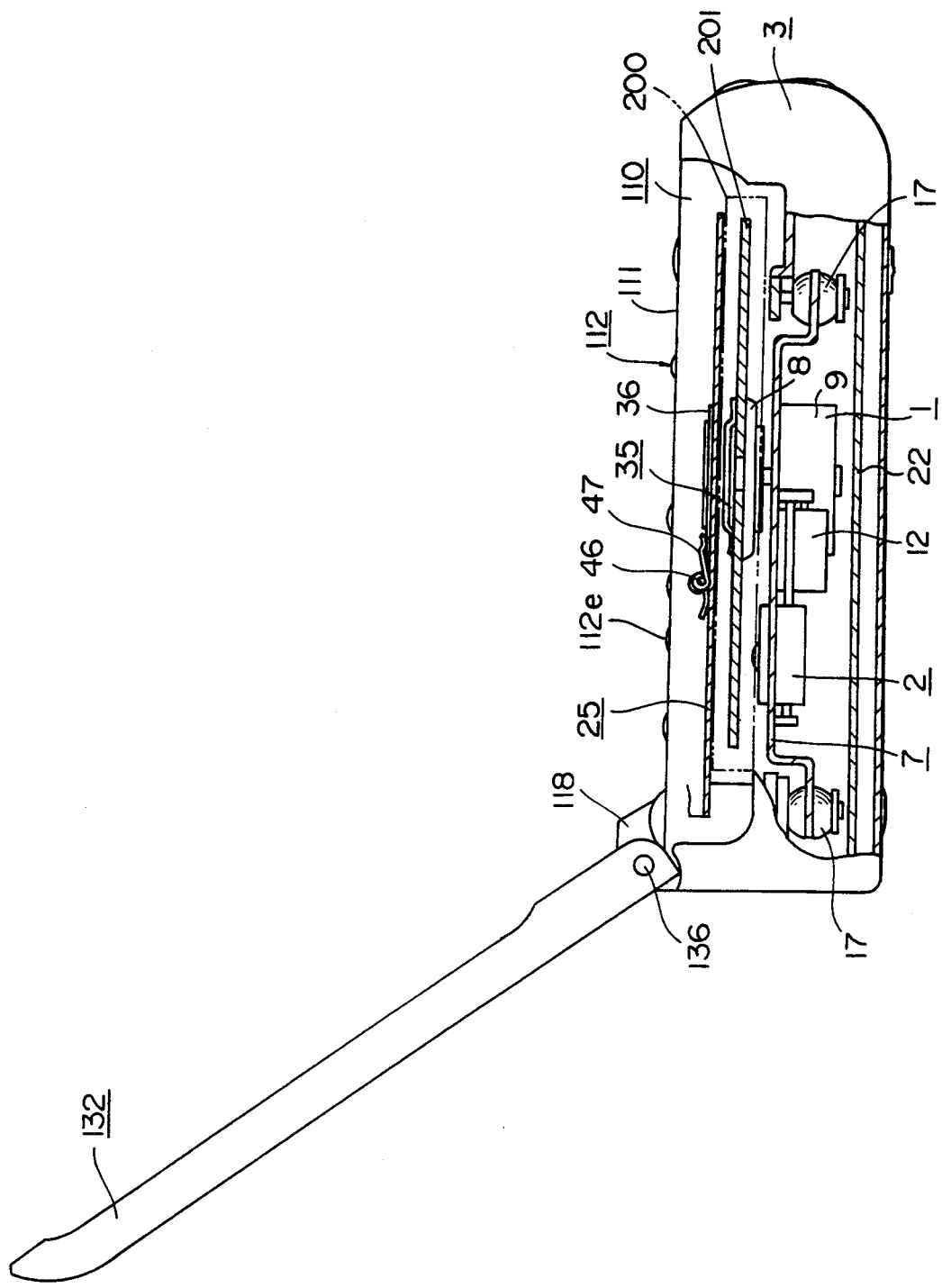
FIG. 11 is a cross-sectional view showing the disc cartridge loaded on the disc loading section.

For ejecting the disc cartridge 200 from the main body 3 after the end of the readout and reproduction of the desired information, the start/stop button 140 is actuated to stop the operation of the disc player. The first cover 110 is then rotated in the opening direction. The cartridge holder 25 follows the rotation of the first cover 110 in the opening direction so that the cartridge holder 25 reaches the raised position relative to the main body 3. When the cartridge holder 25 is rotated towards its raised position in the direction shown by an arrow X in FIG. 10B, the slide lever 82 is slid in the direction shown by an arrow H in FIG. 10A. When the slide lever 82 is slid in this manner, the lever 48 connected to the slide lever 82 is rotated in the direction shown by an arrow J in FIG. 10A, about the supporting shaft 94 as the center of rotation. The inclined guide surface 97a of the clamper mounting plate rotating section 97 is intruded below the clamper mounting plate 36, while it abuts on the surface 97b of the clamper mounting plate 36, as shown in FIG. 9A. Thus the clamper mounting plate 36 is rotated by the rotating section 97 in the direction shown by an arrow K in FIG. 11, against the bias of the torsion coil spring 47. When the clamper mounting plate 36 is rotated in this manner, the disc clamper 35, which has so far clamped the optical disc in cooperation with the disc table 8, is disengaged from the disc table 8 to release the disc 201, at the same time that the disc clamper 35 is withdrawn outwards from within the cartridge holder 25.

When the slide lever 82 is slid further in the direction shown by an arrow H in FIG. 10A in continuation to the unclamping of the optical disc 201 from the disc table 8, the pin thrusting arm section 88 of the unlocking lever 54 mounted on the slide lever 82 forces the thrust operating pin 69 of the locking lever 54 to rotate the locking lever 54 in the direction opposite to the direction shown by an arrow F in FIG. 10A against the tension of the torsion coil spring 72. When the locking lever 54 is rotated in this manner, the locking pin 67 is disengaged from the locking pawl 68 of the lever 53, which is slid suddenly in the direction shown by an arrow D in FIG. 9A under the force of the torsion coil spring 52. When the lever 53 is slid in this manner, the shutter opening arm 51 connected to the lever 53 is rotated in the direction shown by an arrow C in FIG. 9A, with the fulcrum 57 as the center of rotation, for ejecting the disc cartridge 200 out of the cartridge holder 25. At this time, the shutter 207 of the disc cartridge 200 is moved by the rotational operation in the direction of the arrow C in FIG. 9A and under the bias of the shutter closure spring 210 to close the apertures 205 and 206 of the main cartridge body 202.

Meanwhile, a mistaken insertion inhibit member 170 is provided on the cartridge holder 25 to prevent the mistaken insertion of the disc cartridge 200 as well as to thrust the one lateral surface of the disc cartridge 200 inserted into the disc cartridge 200 to prevent the disc cartridge 200 from being ejected inadvertently out of the cartridge holder 25 at the time of ejection. The mistaken insertion inhibit member 170 is constituted by a torsion coil spring which, as shown in FIG. 5A, is mounted to a mounting boss 143 on the major surface 28 of the cartridge holder 28, and has an L-shaped mistaken insertion inhibit end section 170a protruded into the inside of the cartridge holder 25 and a retention end section 170b retained by a retainer 175 on the major surface 28 of the cartridge holder 28. When the disc cartridge 200 is inserted into the cartridge holder 25 from an incorrect direction, the disc cartridge 200 has a portion thereof retained by the end section 170a to prevent the correct insertion of the disc cartridge 200 into the disc cartridge 200. At the time of ejection of the disc cartridge 200, the end section 170a thrusts and supports one lateral side of the main cartridge body 202 to prevent inadvertent ejection of the disc cartridge 200 from the disc cartridge 25.

With the disc cartridge 200 thus ejected out of the cartridge holder 25, the disc cartridge 200 is taken out manually from the cartridge holder 25 to terminate the ejecting operation.

When the optical disc 220 is mounted, the first cover 110 is opened to expose the disc loading section 6 of the main body 3. Since the optical disc 220 then faces the outside, it may be grasped with hand or finger and removed from the disc table 8 by way of performing the ejecting operation.

It will be noted that, when ejecting the optical disc 220 per se, the operation of the disc clamper 35 or the shutter opening arm 51 is similar to that when ejecting the disc cartridge 200, so that the direction therefor is omitted for simplicity.

When the disc player according to the present invention is not used and set in store, the first cover 110 is closed upon the disc loading section 6 on the upper surface of the main body 3. The second cover 132 is then rotated towards the main body 3 and brought to a closure position on the first cover 110, whereby the operating keys 112 on the upper surface of the first cover 110 is covered by the second cover 132. The display section 133 provided on the second cover 132 is positioned on the inner and folded upon the main body 3. With the first and second covers 110, 132 thus brought to the closure state, the covers 110 and 132 are folded or closed unitarily upon the main body 3 into a compact casing which may be transported freely in a bag or the like.

The above described disc player may be driven not only by a commercial d.c. source (9 V) by means of a jack 147, but also by a charging battery or a dry battery removably mounted on the main body 3.

Figure 19A:
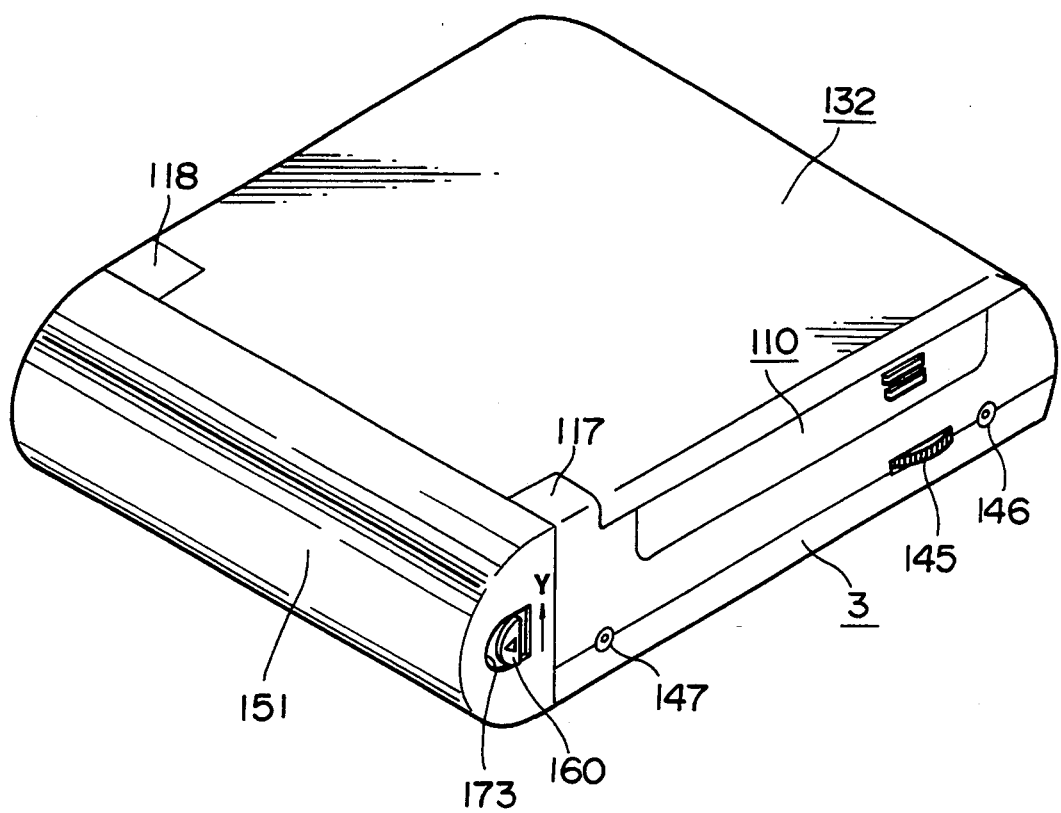
FIG. 19A is a perspective view showing a charging battery pack attached to a disc player.
Figure 19B:
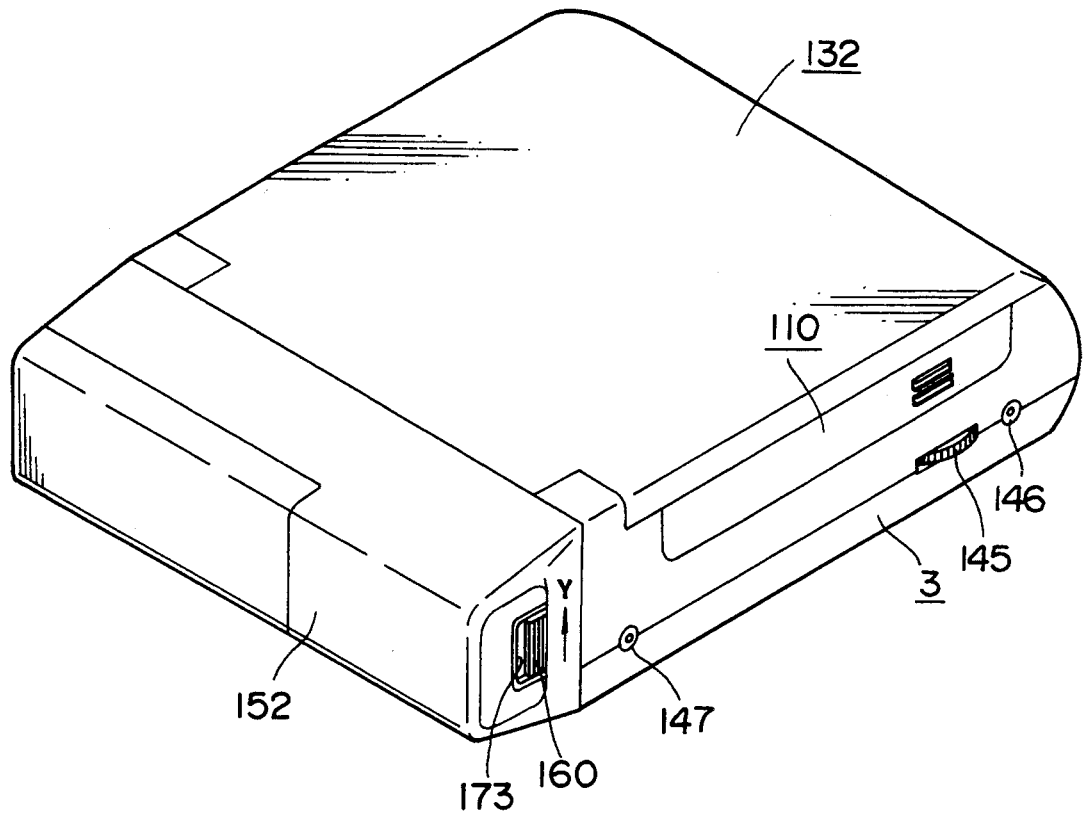
FIG. 19B is a perspective view showing a dry battery casing attached to a disc player.
Figure 20:
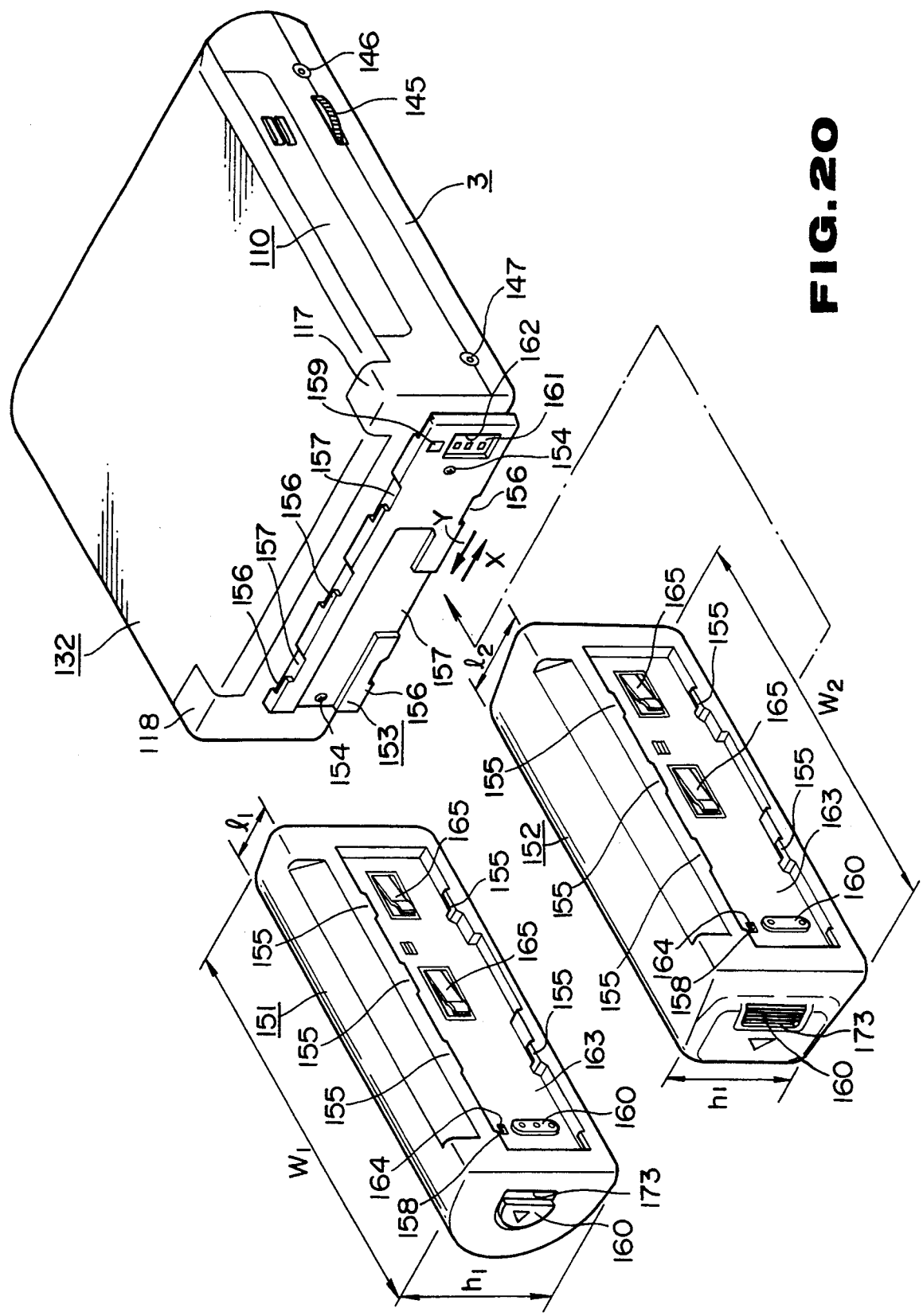
FIG. 20 is a perspective view showing a battery pack mounting plate provided on a disc player, a charging battery pack which can be attached to the disc player and a dry battery casing which can also be attached to the player.

To this end, a charging battery pack 151 or a dry battery casing 152 may be selectively loaded on the back side of the main body 103 of the disc player as shown in FIG. 19A and 19B. On the back side of the main body 3, a battery pack mounting plate 153 is mounted by set screws 154 for detachably mounting the charging battery pack 151 or the dry battery casing 152 thereto. As shown in FIG. 20, the mounting plate 153 is formed with a plurality of engaging pieces 156 engaged by a corresponding plurality of engaging lugs 155 formed on an abutment surface of the battery pack 151 or the casing 152 to the mounting plate 153. These engaging piece 156 are formed on the confronting side edge of the mounting plate 153 as convex-shaped pieces by forming slots or grooves on the back side of the mounting plate 153 in continuation to concave-shaped recesses 157 into which the lugs 155 are intruded. The mounting plate 153 is also formed with an engaging recess 158a engaged by a locking pawl 158 provided on the battery pack 151 or the casing 152.

A connection terminal plate 161 for establishing electrical connection with a terminal pin 171 on the battery pack 151 or on the dry battery casing 152 on loading the battery pack 151 or the dry battery casing 152 is provided on the back side of the main body 3. This connection terminal plate 161 is opened to outside by means of an opening 162 formed in the battery pack mounting plate 153.

Figure 21:
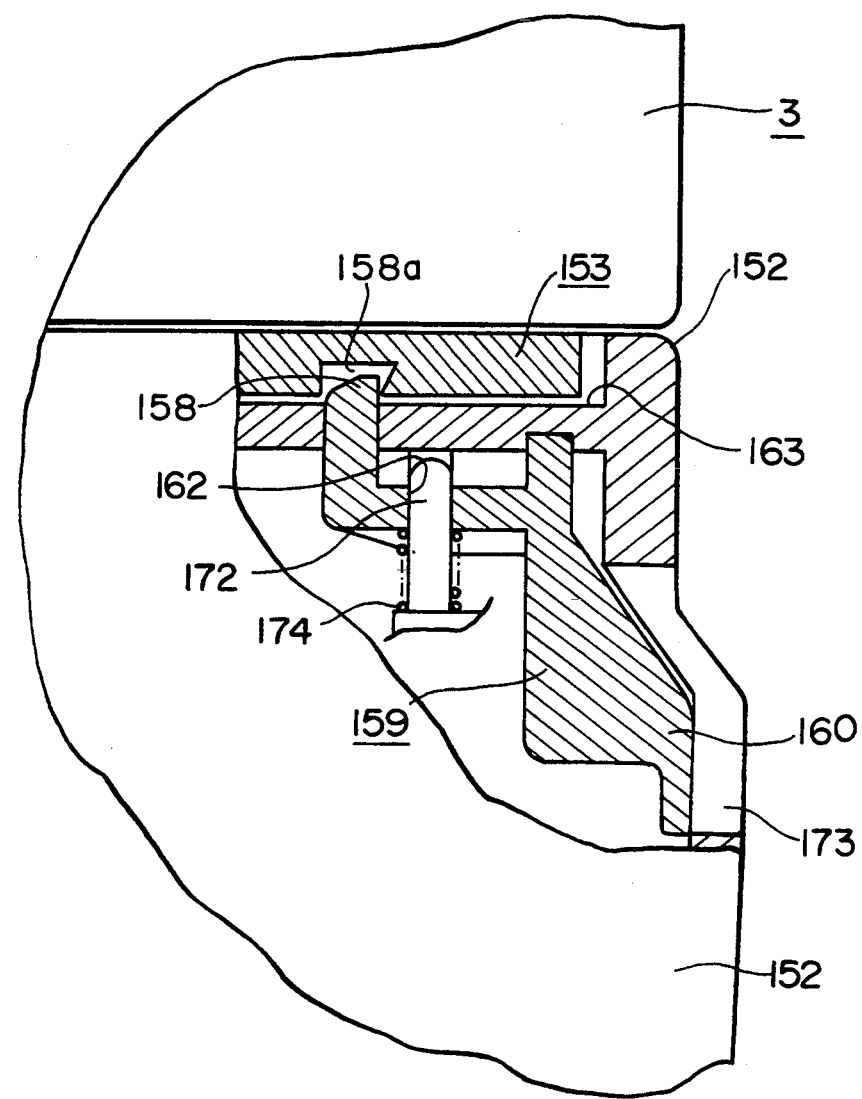
FIG. 21 is a plan view, shown partially in cross-section, showing the battery casing attached on the disc player.

The engaging lugs 155 engaging with the engaging pieces 156 of the battery pack mounting plate 153 provided on the battery pack 151 or the dry battery casing 152 are formed on the upright lateral side of a recess 163 formed on the abutting surface against the mounting plate 153, as shown in FIG. 20. The locking pawl 158 is provided on the battery pack 151 or on the dry battery casing 152 so as to be intruded into or receded from the recess 163 by way of a through-hole 164 formed in the recess 163. As shown in FIG. 21, the locking pawl 158 is formed at the distal end of a locking lever 159. The locking lever 159, having the end locking pawl 158, is arranged in, for example, the dry battery casing 152, as shown in FIG. 21. The locking lever 159 is substantially L-shaped and accommodated in the dry battery casing 152 with an end thrust section 160 facing an opening 173 formed on one end face of the dry battery casing 152. The locking lever 159 is arranged within the casing 152 with a guide pin 172 on the casing 152 introduced through a through-hole 162 in the lever so that the lever 159 may be reciprocally supported for introducing or receding the locking pawl 158 into on out of the recess 163 as the lever is guided by the guide pin 172. It is noted that the locking lever 159 is biased by a compression coil spring 174 placed about the guide pin 163 so that the end locking pawl 158 is intruded into the recess 163.

It is noted that the locking lever provided in the charging battery pack 151 is of a similar construction as that provided in the dry battery casing 152, so that the detailed description thereof is omitted for simplicity.

For preventing a plurality of terminal pins 171 from abutting on a portion of the mounting plate 153 and being thereby damaged during extraction of the battery pack 151 or the dry battery casing 152 from the main body 3, a pair of biasing arms 165, 166 for resiliently biasing the pack 151 or the casing 152 away from the main body 3 are provided on an abutting surface of the pack 151 or casing 152 against the battery pack mounting plate 153.

The terminal pins 171 establish electrical contact with the connection terminal plate 161 provided on the main body 3 is also provided for protruding into the recess 163, as shown in FIG. 20. These terminal pins 171 are biased by springs, not shown, for protruding into the recess 163, while being mounted for reciprocation within the recess 163.

The above described charging battery pack 151 or the dry battery casing 152 are slid in the direction shown by an arrow X in FIG. 20, with the engaging lugs 155 in register with the concave recesses 157 in the battery pack mounting plate 153 and with the engaging lugs 155 engaging with the engaging pieces 156, so that, as shown in FIG. 20, the engaging lugs 155 are engaged with the engaging pieces 156, while the locking pawl 158 is engaged in the engaging recess 158a, as shown in FIG. 21 With the engaging lugs 155 engaging with the engaging pieces 156 and with the locking pawl engaging in the engaging recess 158a, the charging battery pack 151 or the dry battery casing 152 is loaded in position in the main body 3. At this time, the terminal pins 171 are electrically contacted with the connection terminal plate 161 so that the power may be supplied to the main body 3 from the battery in the charging battery pack 151 or in the dry battery casing 152.

Meanwhile, the charging battery pack 151 has a width w1 equal to the width W of the main body, or 105 mm, a length −1 equal to 29 mm and a height h1 equal to 41 mm. The dry battery casing 152 has a width w2 equal to the width W of the main body, or 105 mm, a length 2 equal to 38 mm and a height h2 equal to 41 mm. With the charging battery pack 151 or the dry battery casing 152 loaded on the main body 3, the disc player in its entirety is increased in length only 29 to 38 mm and hence is small-sized enough to be held on the palm of the hand.

With the charging battery pack 151 on the dry battery casing 152 thus loaded on the main body 3, the thrusting section 160 is thrust in the direction shown by an arrow Y in FIG. 20 for shifting the locking lever 159 against the bias of a compression coil spring 164. With the locking lever 159 thus shifted against the bias of the coil spring 174, the terminal locking pawl 158 is receded out of the recess 163 for disengaging the battery pack mounting plate 153 from the engaging recess 158a. The thrust section 160 is thrust manually for sliding the charging battery pack 151 or the dry battery casing 152 in the direction shown by an arrow X in FIG. 20 so that the engaging lugs 155 are disengaged from the engaging pieces 156 for detaching the pack 151 or casing 152 from the main body 3. Meanwhile, the charging battery pack 151 or the dry battery casing 152 are biased at this time by the biasing arms 165, 166 in a direction away from the main body 3, so that they may be detached positively from the main body 3 while, at the same time, the terminal pins 171 are protected from possible damages.

What is claimed is:

1. A disc player comprising:
    a main body including disc rotating driving means for rotationally driving a disc and readout means for reading out information signals recorded on the disc rotationally driven by said disc rotating driving means;
    a first cover having a disc clamping member mounted on one surface thereof;
    a second cover including a display means on at least one surface thereof for displaying the read out information; and
    mounting means for rotatably mounting said first and second covers on the main body so that said first and second covers are each movable between opened and closed positions, with the disc to be played being secured on the disc rotating driving means by the disc clamping member when the first cover is in the closed position and with the display means being exposed for viewing by a user when the second cover is in the opened position while the first cover is in the closed position.

2. The disc player according to claim 1 wherein said first cover is disposed intermediate said second cover and said main body when said first and second covers are in the closed position.

3. The disc player according to claim 2 wherein said main body includes a disc loading section for receiving the disc to be played and wherein the first cover is disposed over and is substantially coextensive with the disc loading section when in the closed position.

4. The disc player according to claim 3 wherein said first cover is coextensive with at least a portion of said disc loading section when the first cover is in the closed position.

5. The disc player according to claims 1 or 2 wherein said second cover is disposed over and is at least partially coextensive with said first cover when said first and second covers are in the closed position.

6. The disc player according to claim 5 further comprising locking means for locking said first cover at the closed position.

7. The disc player according to claim 1 wherein a disc loading section is provided in said main body for receiving a disk to be placed on said disc rotating driving means when said first cover is in the opened position and wherein the width of each of the disc loading section, the first and second covers and the disc are substantially the same.

8. The disc player according to claim 1 wherein a plurality of operating buttons are provided on another surface of said first cover opposite the one surface.

9. The disc player according to claim 1 wherein a cartridge holder means is mounted on said one surface of said first cover for receiving and holding a disc cartridge, rotatably accommodating a disc therein when inserted into said cartridge holder means.

10. The disc player according to claim 9 wherein the disc cartridge is provided with a shutter movable between a closed position and an opened position for providing access to the disc within the disc cartridge and wherein the cartridge holder means includes shutter opening means for opening and closing the shutter.

11. The disc player according to claim 10 wherein said shutter opening means opens the shutter when the disc cartridge is inserted into the cartridge holder means.

12. The disc player according to claim 10 further including move means for moving said shutter opening means to a position not obstructing disc rotation when said first cover is in the closed position.

13. A portable disc player comprising a main body, said main body including disc loading section means for receiving a disc to be played and said main body accommodating at least disc rotating driving means for rotating the disc to be played, a head for reading out information signals recorded on the disc rotationally driven by said disc rotating driving meads, feed means for feeding said head along the radius of said disc, a signal processing section for processing signals read out by said head, and a control section for controlling the operation of at least said disc rotating driving means, head, feed means and said signal processing section;
    a display section means having a display for displaying the information recorded on the disc and reproduced by said head;
    mounting means for rotatably mounting the display section means on the main body with the display section means being movable between an opened position where the information on the display is exposed for viewing and a closed position;
    blocking means for preventing a disc from being received by the disc loading section means when said display section means is moved to the closed position;

an operating section mounted on the main body having a plurality of operating buttons for controlling operation of the disc player; and wherein the mounting means is also a means for rotatably mounting the operating section on the main body and said operating section performs at least part of the function of said blocking means.

14. The portable disc player according to claim 13 wherein the maximum dimension of the main body does not exceed 135 mm.

15. The portable disc player according to claim 13 wherein the main body is not more than 105 mm wide, more than 135 mm deep and more than 45 mm high.

16. The portable disc player according to claim 13 wherein said operating section is movable between an closed position where a disc is prevented by the operating section from being received by the disc loading section means, and, while the display section means is in the opened position, the operating buttons are exposed for actuation by a user, and an opened position.

17. The portable disc player according to claim 16 wherein the operating section is disposed intermediate the main body and the display section means when the operating section and display section means are moved to the closed position.

18. The portable disc player according to claim 13 wherein said display section means extends over at least a portion of said operating section when the display and operating sections are in the closed position.

19. The portable disc player according to claim 18 further comprising locking means for locking said display section means in the closed position.

20. A portable disc player comprising a main body, said main body including disc loading section means for receiving a disc to be played and said main body accommodating at least disc rotating driving means for rotating the disc to be played, a head for reading out information signals recorded on the disc rotationally driven by said disc rotating driving means, feed means for feeding said head along the radius of said disc, a signal processing section for processing signals read out by said head, and a control section for controlling the operation of at least said disc rotating driving means, head, feed means and said signal processing section;

a display section means having a display for displaying the information recorded on the disc and reproduced by said head;

mounting means for rotatably mounting the display section means on the main body with the display section means being movable between an opened position where the information on the display is exposed for viewing and a closed position;

blocking means for preventing a disc from being received by the disc loading section means when said display section means is moved to the closed position;

an operating section having a plurality of operating buttons for controlling operation of the disc player; and wherein said mounting means is also a means for rotatably mounting the operating section on the main body, with the operating section being movable between a closed position where the operating buttons are exposed for actuation by a user, while the display section means is in the opened position, and an open position and wherein the main body includes a disc loading section for receiving the disc to be played when said operating section is in the opened position.

21. A portable disc player comprising a main body, said main body including disc loading section means for receiving a disc to be played and said main body accommodating at least disc rotating driving means for rotating the disc to be played, a head for reading out information signals recorded on the disc rotationally driven by said disc rotating driving means, feed means for feeding said head along the radius of said disc, a signal processing section for processing signals read out by said head, and a control section for controlling the operation of at least said disc rotating driving means, head, feed means and said signal processing section;

a display section means having a display for displaying the information recorded on the disc and reproduced by said head;

mounting means for rotatably mounting the display section means on the main body with the display section means being movable between an opened position where the information on the display is exposed for viewing and a closed position;

blocking means for preventing a disc from being received by the disc loading section means when said display section means is moved to the closed position;

an operating section having a plurality of operating buttons for controlling operation of the disc player; and wherein said mounting means is also a means for rotatably mounting the operating section on the main body, with the operating section being movable between a closed position where the operating buttons are exposed for actuation by a user, while the display section means is in the opened position, and an opened position and wherein said operating section extends over at least a portion of said disc loading section when said operating section is in the closed position.

22. The portable disc player according to claim 21 further including clamping means on said operating section for clamping the disc in cooperation with said disc rotating driving means when the operating section is in the closed position.

23. The portable disc player according to claim 22 further including a cartridge holder means for receiving and holding a disc cartridge rotatably accommodating the disc therein, with the cartridge holder means being mounted on said operating section.

24. The portable disc player according to claim 23 wherein the disc cartridge includes a shutter moveable between a closed position and an opened position for providing access to the disc within the disc cartridge and wherein the cartridge holder means includes shutter opening means for opening the shutter of the disc cartridge.

25. The portable disc player according to claim 24 wherein said shutter opening means engages with said shutter on insertion of said disc cartridge into said cartridge holder means for shifting said shutter in the opened position direction.

26. The portable disc player according to claim 24 further including moving means for moving said shutter opening means to a position of not obstructing disc rotation when said operating section has been rotated to the closed position.

27. A disc reproducing apparatus comprising a main body accommodating therein at least disc rotating driving means, a head for reading out information signals recorded on a disc rotationally driven by said disc rotating driving means, feed means for feeding said head along the radius of the disc, a signal processing section for processing signals read out by said head, and a control section for controlling the operation of at least said disc rotating driving means, head, feed means and said signal processing section, said main body including disc loading section means for receiving an optical disc;

a display section means having a display for displaying the information recorded on said disc and reproduced by said head;

mounting means for rotatably mounting the display section means on the main body, with the display section means being movable between an opened position where the information on the display is exposed for viewing and a closed position; and blocking means for preventing a disc from being received by the disc loading section means when said display section means is moved to the closed position;

an operating section including a plurality of operating buttons for controlling operation of the disc reproducing apparatus; and wherein the mounting means is also a means for rotatably mounting the operating section on said main body so that the operating section is movable between a closed position and an opened position.

28. The disc reproducing apparatus according to claim 27 wherein when said operating section is in the closed position the operating buttons are exposed for operation by a user.

29. The disc reproducing apparatus according to claim 28 wherein said operating section is disposed intermediate the main body and the display section means when the operating section and display section means are moved to the closed position and wherein said operating section performs at least part of the function of said blocking means when said operating section is moved to the closed position.

30. The disc reproducing apparatus according to claim 27 wherein said display section means extends over at least a portion of said operating section when the display section means and said operating section are in the closed position.

31. The disc reproducing apparatus according to claim 30 further comprising locking means for locking said display section means in the closed position.

32. The disc reproducing apparatus according to claim 27 wherein the main body includes a disc loading section for receiving the disc when said operating section is in the opened position.

33. The disc reproducing apparatus according to claim 27 wherein the main body includes a disc loading section for receiving the disc and wherein said operating section extends over at least a portion of said disc loading section when said operating section is in the closed position.

34. The disc reproducing apparatus according to claim 33 further including clamping means on said operating section for clamping the disc in cooperation with said disc rotating driving means when the operating section is in the closed position.

35. The disc reproducing apparatus according to claim 34 further including a cartridge holder means for receiving and holding a disc cartridge, rotatably accommodating the disc therein, with the cartridge holder means being mounted on said operating section.

36. The disc reproducing apparatus according to claim 35 wherein the disc cartridge includes a shutter moveable between a closed position and an opened position for providing access to the disc within the disc cartridge and wherein the cartridge holder means includes shutter opening means for opening the shutter of the disc cartridge.

37. The disc reproducing apparatus according to claim 36 wherein said shutter opening means engages with said shutter on insertion of said disc cartridge into said cartridge holder means for shifting said shutter in the opened position direction.

38. The disc reproducing apparatus according to claim 36 further including means for moving said shutter opening means to a position of not obstructing the disc rotation when said operating section has been rotated to the closed position.

39. A disc reproducing apparatus comprising:

a main body of the apparatus;

a loading unit means on the main body for loading a disc cartridge rotatably accommodating a disc therein which rotates in a plane, the loading unit means being adapted to load disc cartridges having predetermined outer dimensions in the plane in which the disc rotates;

reproducing means disposed within the main body for reproducing the disc accommodated in a disc cartridge loaded by the loading unit means, and a cover having display means mounted thereon for displaying the information reproduced by the reproducing means;

mounting means for rotatably mounting the cover on the main body so that the cover is moveable between an opened position wherein the information may be viewed by a user and a closed position;

the main body having dimensions along the plane in which the disc rotates substantially equal to the size of the predetermined outer dimensions of the disc cartridge, and the cover having outer dimensions which are also substantially equal to the predetermined outer dimensions of the disc cartridge;

an operating section mounted on the main body including a plurality of operating buttons for controlling operation of the disc reproducing apparatus; and wherein the operating section is mounted on the loading unit means and said mounting means is also a means for rotatably mounting the loading unit means on said main body.

40. The disc reproducing apparatus according to claim 39 wherein said loading unit means has a cartridge insertion and removal opening having a width lesser than the dimension of a diagonal line of the disc cartridge loaded by said loading unit means.

41. The disc reproducing apparatus according to claim 39 wherein said loading unit means is moveable between an opened position and a closed position.

42. The disc reproducing apparatus according to claim 41 wherein said loading unit means is disposed intermediate said main body and said cover when said loading unit means and said cover are in said closed position.

43. The disc reproducing apparatus according to claim 41 wherein said cover extends over at least a portion of said operating section when said cover is in the closed position.

44. The disc reproducing apparatus according to claim 41 further comprising locking means for locking said cover in said closed position.

45. The disc reproducing apparatus according to claim 41 further including a disc loading area on said main body for receiving a disc placed on said disc rotating driving means of said reproducing means when said loading unit means is in said opened position.

46. The disc reproducing apparatus according to claim 45 further including clamping means on said loading unit means for clamping the disc in cooperation with said rotating driving means when said loading unit means is in said closed position.

47. The disc reproducing apparatus according to claim 39 wherein the disc cartridge includes a shutter moveable between a closed position and an opened position for providing access to the disc within the disc cartridge and wherein said loading unit means includes shutter opening means for opening the shutter.

48. The disc reproducing apparatus according to claim 47 wherein said shutter opening means engages said shutter on insertion of said disc cartridge into said loading unit means and moves said shutter towards the open position.

49. A disc player comprising:
a main body including disc rotating driving means for rotationally driving a disc and readout means for reading out information signals recorded on the disc rotationally driven by said disc rotating driving means and disc loading section means for receiving a disc to be played;
a first cover including an operating section, said operating section having a plurality of operating buttons for controlling operation of the disc player;
a second cover including a display means on at least one surface thereof for displaying the read out information; and
mounting means for rotatably mounting said first and second covers on the main body so that said first and second covers are each movable between opened and closed positions, wherein the display means is exposed for viewing by a user and said operating buttons are exposed for operation by a user only when the second cover is in the opened position and the first cover is in the closed position, and wherein said first cover is disposed intermediate said main body and said second cover when said first and second covers are in the closed position.

50. The disc player of claim 49 wherein said first cover functions to prevent access to the disc loading section means thereby preventing a disc from being inserted therein when said first cover is in the closed position.

51. The disc player of claim 49 wherein the disc loading section, the first cover and the second cover each have a width which are substantially the same.

52. A disc reproducing apparatus comprising:
a main body of the apparatus;
a loading unit means on the main body and movable between an opened position and a closed position for loading a disc cartridge rotatably accommodating a disc therein which rotates in a plane, said loading unit means being adapted to load disc cartridges having predetermined outer dimensions in the plane in which the disc rotates;
reproducing means disposed within the main body for reproducing the disc accommodated in a disc cartridge loaded by said loading unit means;
a cover having display means mounted thereon for displaying the information reproduced by said reproducing means;
an operating section including a plurality of operating buttons for controlling operation of the disc producing apparatus, with the operating section being mounted on the loading unit means; and
mounting means for rotatably mounting said cover and said loading unit means on said main body so that said cover is moveable between an opened position wherein said information may be viewed by a user and a closed position, said main body having dimensions along the plane in which the disc rotates substantially equal to the size of the predetermined outer dimensions of the disc cartridge.

53. The disc reproducing apparatus according to claim 52 wherein said loading unit means is disposed intermediate said main body and said cover when said loading unit means and said cover are in said closed position.

54. The disc reproducing apparatus according to claim 53 wherein said cover extends over at least a portion of said operating section when said cover is in the closed position.

55. The disc reproducing apparatus according to claim 54 further comprising locking means for locking said cover in said closed position.

56. The disc reproducing apparatus according to claim 54 further including a disc loading area on said main body for receiving a disc placed on said disc rotating driving means of said reproducing means when said loading unit means is in said opened position.

57. The disc reproducing apparatus according to claim 56 further including clamping means on said loading unit means for clamping the disc in cooperation with said rotating driving means when said loading unit means is in said closed position.

* * * * *